United States Patent
Ramer et al.

(10) Patent No.: US 10,332,364 B2
(45) Date of Patent: Jun. 25, 2019

(54) LIGHTING DEVICE AND APPARATUS WITH MULTIPLE APPLICATIONS FOR PROCESSING A COMMON SENSED CONDITION

(71) Applicant: ABL IP HOLDING LLC, Conyers, GA (US)

(72) Inventors: David P. Ramer, Reston, VA (US); Jack C. Rains, Jr., Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/389,529

(22) Filed: Dec. 23, 2016

(65) Prior Publication Data

US 2017/0105271 A1 Apr. 13, 2017

Related U.S. Application Data

(63) Continuation of application No. 14/702,107, filed on May 1, 2015, which is a continuation of application No. 13/463,586, filed on May 3, 2012, now Pat. No. 9,125,255.

(51) Int. Cl.
*H05B 37/02* (2006.01)
*G08B 5/36* (2006.01)

(52) U.S. Cl.
CPC .......... *G08B 5/36* (2013.01); *H05B 37/0227* (2013.01); *H05B 37/0245* (2013.01); *Y02B 20/48* (2013.01)

(58) Field of Classification Search
None
See application file for complete search history.

(56) References Cited

U.S. PATENT DOCUMENTS

| | | | |
|---|---|---|---|
| 4,749,254 A | 6/1988 | Seaver | |
| 5,235,320 A * | 8/1993 | Romano | G08B 25/10 340/531 |
| 5,705,804 A | 1/1998 | Ramer | |
| 5,769,527 A | 6/1998 | Taylor | |
| 5,770,928 A | 6/1998 | Chansky | |
| 5,803,589 A | 9/1998 | Lee | |

(Continued)

FOREIGN PATENT DOCUMENTS

| | | | |
|---|---|---|---|
| CN | 103034193 A | * | 4/2013 |
| JP | 2008210711 A | * | 9/2008 |

(Continued)

OTHER PUBLICATIONS

Entire prosecution history of U.S. Appl. No. 13/463,586, filed May 3, 2012, entitled "Networked Architecture for System of Lighting Devices Having Sensors, for Intelligent Applications."

(Continued)

*Primary Examiner* — Chico A Foxx
(74) *Attorney, Agent, or Firm* — RatnerPrestia

(57) ABSTRACT

A lighting device or an apparatus for use with a light source has one or more sensors, intelligence in the form of programmed processors and communication capabilities. Each sensor is configured to monitor one or more conditions external to a lighting device not directly related to operational performance of the respective lighting device. Programming provides a standardized interface to enable processing of sensed conditions from sensors of different types.

20 Claims, 5 Drawing Sheets

(56) References Cited

U.S. PATENT DOCUMENTS

| | | | |
|---|---|---|---|
| 6,043,873 A | 3/2000 | Ramer | |
| 6,487,442 B1* | 11/2002 | Wood | A61B 5/0468 |
| | | | 600/515 |
| 6,522,664 B1 | 2/2003 | Kawahara | |
| 7,046,160 B2* | 5/2006 | Pederson | B60Q 1/2611 |
| | | | 340/815.45 |
| 7,333,903 B2 | 2/2008 | Walters | |
| 7,546,167 B2 | 6/2009 | Walters | |
| 8,005,108 B1 | 8/2011 | Broad et al. | |
| 8,094,040 B1 | 1/2012 | Cornett et al. | |
| 8,130,371 B2 | 3/2012 | Imura | |
| 8,140,276 B2 | 3/2012 | Walters | |
| 8,179,787 B2 | 5/2012 | Knapp | |
| 8,234,363 B1 | 7/2012 | Kuo | |
| 8,248,230 B2* | 8/2012 | Covaro | H02J 13/0003 |
| | | | 340/12.32 |
| 8,732,031 B2 | 5/2014 | Martin | |
| 8,755,039 B2 | 6/2014 | Ramer | |
| 9,001,317 B2 | 4/2015 | Ramer | |
| 9,197,865 B2* | 11/2015 | Chien | H04N 5/2354 |
| 9,549,110 B2* | 1/2017 | Chien | F21V 33/0052 |
| 2002/0008625 A1* | 1/2002 | Adams | G08B 21/0211 |
| | | | 340/573.1 |
| 2002/0078221 A1 | 6/2002 | Blackwell et al. | |
| 2003/0057886 A1 | 3/2003 | Lys | |
| 2003/0110515 A1* | 6/2003 | Satoda | H04N 21/23418 |
| | | | 725/135 |
| 2004/0130458 A1 | 7/2004 | Koutsoukos | |
| 2005/0083197 A1 | 4/2005 | Glenn | |
| 2005/0253533 A1* | 11/2005 | Lys | H05B 33/0815 |
| | | | 315/224 |
| 2007/0001872 A1* | 1/2007 | Ellison | G08G 1/0965 |
| | | | 340/907 |
| 2007/0045524 A1 | 3/2007 | Rains | |
| 2007/0162669 A1 | 7/2007 | Martin et al. | |
| 2007/0223723 A1* | 9/2007 | Haase | H04R 1/028 |
| | | | 381/77 |
| 2007/0237284 A1 | 10/2007 | Lys | |
| 2008/0071933 A1 | 3/2008 | Nonaka | |
| 2008/0111498 A1 | 5/2008 | Budike | |
| 2008/0218117 A1* | 9/2008 | Kern | H02P 1/029 |
| | | | 318/778 |
| 2008/0265799 A1 | 10/2008 | Sibert | |
| 2009/0040775 A1* | 2/2009 | Scheibe | G09F 9/33 |
| | | | 362/373 |
| 2009/0082004 A1 | 3/2009 | Duggal et al. | |
| 2009/0297158 A1* | 12/2009 | Iizuka | H04B 10/1125 |
| | | | 398/130 |
| 2009/0299527 A1 | 12/2009 | Huizenga | |
| 2009/0303703 A1* | 12/2009 | Kao | F21S 8/086 |
| | | | 362/183 |
| 2010/0037322 A1 | 2/2010 | Blanchet | |
| 2010/0114340 A1 | 5/2010 | Huizenga | |
| 2010/0237695 A1* | 9/2010 | Covaro | H02J 13/0003 |
| | | | 307/19 |
| 2010/0259931 A1 | 10/2010 | Chemel | |
| 2010/0277089 A1* | 11/2010 | Chien | H04N 5/2354 |
| | | | 315/287 |
| 2010/0280795 A1* | 11/2010 | Sheu | G06F 13/385 |
| | | | 702/187 |
| 2010/0301769 A1 | 12/2010 | Chemel | |
| 2011/0053492 A1* | 3/2011 | Hochstein | H05B 37/0272 |
| | | | 455/7 |
| 2011/0154350 A1 | 6/2011 | Doyle | |
| 2011/0187542 A1* | 8/2011 | Dittmer | G08B 5/36 |
| | | | 340/628 |
| 2012/0002406 A1 | 1/2012 | Leadford | |
| 2012/0025717 A1 | 2/2012 | Klusmann | |
| 2012/0040606 A1 | 2/2012 | Verfuerth | |
| 2012/0057050 A1 | 3/2012 | Ashdown | |
| 2012/0086561 A1 | 4/2012 | Ilyes | |
| 2012/0095791 A1* | 4/2012 | Stefik | G06Q 10/02 |
| | | | 705/5 |
| 2012/0169507 A1* | 7/2012 | Dyer | F21V 23/0471 |
| | | | 340/693.11 |
| 2012/0195304 A1* | 8/2012 | Fogel | H04L 65/1053 |
| | | | 370/352 |
| 2012/0202094 A1* | 8/2012 | Sada | H02J 7/355 |
| | | | 429/9 |
| 2012/0222083 A1 | 8/2012 | Vaha-Sipila et al. | |
| 2012/0243732 A1 | 9/2012 | Swaminathan et al. | |
| 2012/0287614 A1* | 11/2012 | Kajiya | H05K 1/147 |
| | | | 362/184 |
| 2013/0013091 A1* | 1/2013 | Cavalcanti | H05B 37/0272 |
| | | | 700/90 |
| 2013/0083002 A1 | 4/2013 | Hwang | |
| 2013/0088155 A1 | 4/2013 | Maxik | |
| 2013/0198625 A1 | 8/2013 | Anderson et al. | |
| 2013/0234595 A1 | 9/2013 | Martin | |
| 2014/0347207 A1 | 11/2014 | Zeng et al. | |
| 2015/0185161 A1 | 7/2015 | Gettings et al. | |
| 2015/0259078 A1 | 9/2015 | Filipovic et al. | |
| 2015/0302728 A1 | 10/2015 | Gettings et al. | |
| 2016/0255697 A1 | 9/2016 | Bhide | |

FOREIGN PATENT DOCUMENTS

| | | |
|---|---|---|
| JP | 2011040639 A * | 2/2011 |
| WO | 2008134810 | 11/2008 |
| WO | 2010086757 | 8/2010 |
| WO | 2011032059 | 3/2011 |
| WO | 2011121470 | 10/2011 |
| WO | 2012005718 | 1/2012 |

OTHER PUBLICATIONS

Entire prosecution history of U.S. Appl. No. 13/463,594, filed May 3, 2012, entitled "Lighting Devices With Sensors for Detecting One or More External Conditions and Networked System Using Such Devices."

Entire prosecution history of U.S. Appl. No. 14/702,107, filed May 1, 2015, entitled "Lighting Device and Apparatus With Multiple Applications for Processing a Common Sensed Condition."

Entre prosecution history of U.S. Appl. No. 14/285,881, filed May 23, 2014, entitled "Kighting Devices With Sensors for Detecting One or More External Conditions and Networked System Using Such Devices."

International Search Report and Written Opinion of International Application No. PCT/US2013/037968, dated Jul. 2, 2013, 2 pages.

Non Final Office Action dated Aug. 4, 2016, issued in U.S. Appl. No. 14/847,723, titled "Networked System of Intellligent Lighting Defvices With Sharing of Processing Resources of the Devices With Other Entities," 21 pages.

Non Final Office Action dated Aug. 26, 2013, in U.S. Appl. No. 13/463,594, filed May 3, 2012, entitled "Lighting Devices With Sensors for Detecting One or More External Conditions and Newtworked System Using Such Devices," 9 pages.

Non Final Office Action issued in U.S. Appl. No. 13/463,594, dated Dec. 26, 2013 14 pages.

Notice of Allowance dated Sep. 30, 2015 in U.S. Appl. No. 14/617,444, filed Feb. 9, 2015, entitled "Lighting Device and Apparatus With Standardized Interface for Processing One or More Sensed External Conditions," 7 pages.

Savvides Andreas, et al., "Imager Bases Sensor Networks for Understanding and /Creating Behaviors," Broadband Networks, 2005, 2nd International Conference on Boston, MA, Oct. 3-7, 2005, Piscataway, NJ, IEEE, Oct. 3, 2005, pp. 52-58.

Supplementary European Search Report issued in International Patent Application No. PCT/US2013/037968, dated Aug. 23, 2016, 14 pages.

Eurpean Office Action for EP application No. 13825864.5, dated Jan. 25, 2017, Communication Pursuant to Article 94(3) EPC, 5 pages.

Final Office Action for U.S. Appl. No. 14/702,107, dated Jun. 23, 2017, 47 pages.

Office Action for U.S. Appl. No. 14/702,107 dated Oct. 6, 2017 (53 pages).

(56) References Cited

OTHER PUBLICATIONS

Final Office Action for U.S. Appl. No. 14/702,107, dated Mar. 13, 2018, 58 pages.
European Communication Pursuant to Article 94(3) for European Application No. 13784870.1, dated Jun. 1, 2018, 10 pages.
Notice of Allowance for U.S. Appl. No. 14/702,107, dated Jun. 11, 2018, 14 pages.

* cited by examiner

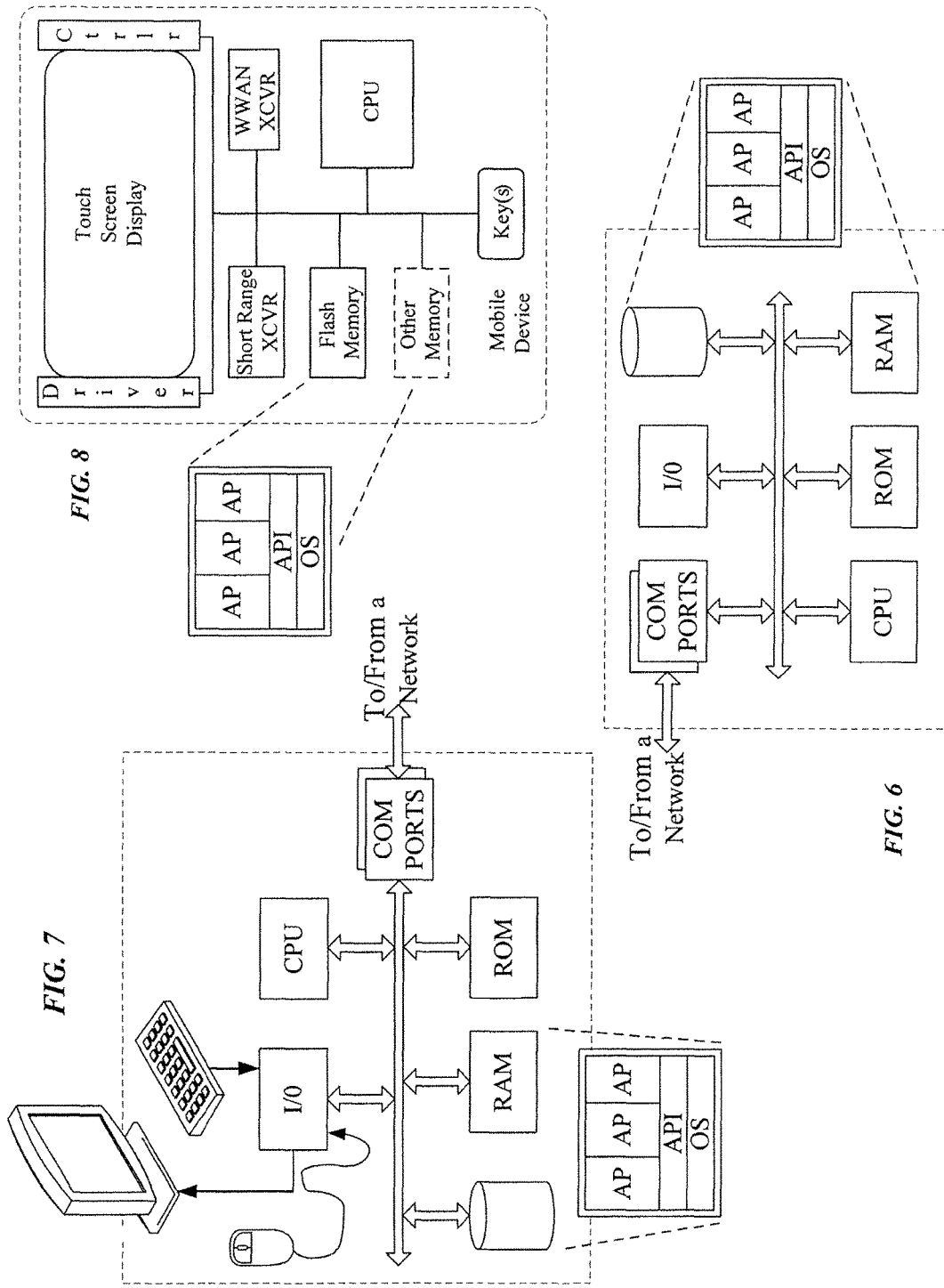

LIGHTING DEVICE AND APPARATUS WITH MULTIPLE APPLICATIONS FOR PROCESSING A COMMON SENSED CONDITION

RELATED APPLICATIONS

This application is a continuation of U.S. application Ser. No. 14/702,107, Filed May 1, 2015, entitled "LIGHTING DEVICE AND APPARATUS WITH MULTIPLE APPLICATIONS FOR PROCESSING A COMMON SENSED CONDITION," the disclosure of which is entirely incorporated herein by reference.

U.S. application Ser. No. 14/702,107 is a continuation of U.S. application Ser. No. 13/463,586, Filed May 3, 2012, entitled "NETWORKED ARCHITECTURE FOR SYSTEM OF LIGHTING DEVICES HAVING SENSORS, FOR INTELLIGENT APPLICATIONS," the disclosure of which is entirely incorporated herein by reference.

U.S. application Ser. No. 14/702,107 is related to U.S. application Ser. No. 14/285,881, filed May 23, 2014 entitled "LIGHTING DEVICES WITH SENSORS FOR DETECTING ONE OR MORE EXTERNAL CONDITIONS AND NETWORKED SYSTEM USING SUCH DEVICES," which is a continuation of U.S. application Ser. No. 13/463,594, filed May 3, 2012 entitled "LIGHTING DEVICES WITH SENSORS FOR DETECTING ONE OR MORE EXTERNAL CONDITIONS AND NETWORKED SYSTEM USING SUCH DEVICES," now U.S. Pat. No. 8,755,039, the disclosures of which also are entirely incorporated herein by reference.

TECHNICAL FIELD

The present subject matter relates to a system and components of the system forming a network of lighting devices, with sensors, intelligence and communication capabilities to monitor one or more conditions external to the lighting devices not directly related to operational performance of the respective lighting devices, for a variety of applications separate and in addition to the lighting related functions of the networked devices.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use. Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often such devices are controlled individually or as relatively small groups at separate locations.

With the advent of modern electronics has come advancement both in the types of light sources and in the control capabilities within the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. Advanced electronics in the control elements have facilitated more sophisticated control algorithms as well as increased networking of lighting devices.

Sensing and network communications, however, have focused on the lighting functions/applications of the lighting devices. For example, sensors may be provided in a lighting device to detect parameters relevant to control operation of the lighting device, and the processor in the device controls the source(s) of the device in response to the sensor inputs. Alternatively or in addition, a communication interface in each of a number of networked lighting devices may allow communication about the status of each lighting device to a system control center. A programmed computer or a person at the control center then may be able to send commands to individual lighting devices or to groups of lighting devices, for example, based on a decision responsive to one or more conditions sensed by some or all of the lighting devices.

However, these advances in lighting devices and networked systems have mainly addressed aspects of the lighting provided by the lighting devices. For example, lighting devices may be adjusted, turned ON and/or turned OFF based on monitored conditions, either by processor logic within the device(s) or commands from a central control. It also has been suggested that networked lighting devices could provide transport for data communications to/from other devices that may come within range of the lighting device and/or its internal communication interface.

It is also useful to monitor and respond to a wide range of other conditions that do not directly relate to lighting. A vast array of sensor types exists for sensing various conditions. In the home, for example, smoke, fire, carbon monoxide and burglary sensors are common. Often such sensing is locally implemented by individual sensing units, with no coordination. In more sophisticated installations, a number of sensors of various types may be couple to a communication device or system, which provides communications to a central system that monitors a number of enterprise premises or a number of individual customer locations. However, the individual devices and the networked monitoring systems have traditionally been separate and independent from the lighting devices in or at the monitored locales. Even in systems that provide combinations of lighting control and condition monitoring and/or communications related to both functions, the lighting and monitoring equipment are separate devices on the premises with separate power and communication capabilities.

Hence, there is still room for further improvement in lighting and monitoring technologies.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a is a simplified functional block diagram of a computer that may be configured as a host or server, for example, to function as the one of the control computers in the system of FIG. 1.

FIG. 7 is a simplified functional block diagram of a personal computer or other user terminal device, which may be used as a control computer or in communication with a server implementation of a control computer, in the system of FIG. 1.

FIG. 8 is a simplified functional block diagram of a mobile device, as an alternate example of a user terminal device, which may be used as a control computer or in communication with a server implementation of a control computer, in the system of FIG. 1.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed below relate to systems and components (e.g. lighting devices and control computers) forming a network of intelligent lighting devices with sensors to monitor one or more external conditions. Reference now is made in detail to the examples illustrated in the accompanying drawings and discussed below.

Figure 1:
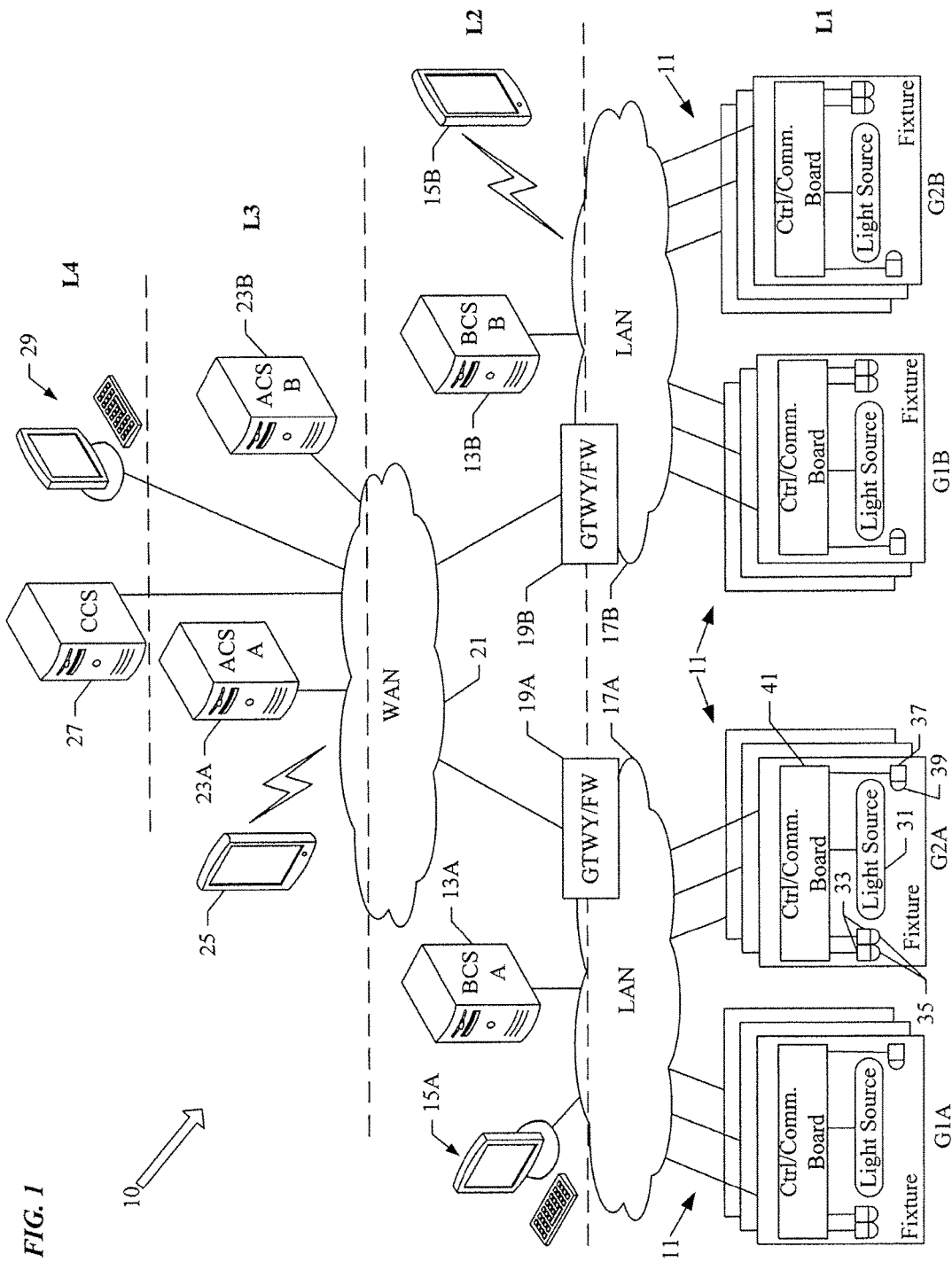
FIG. 1 is a functional block diagram of an exemplary system of intelligent lighting devices and hierarchical layers of control computers.

By way of an example, FIG. 1 shows a system 10 that forms a network of intelligent lighting devices 11, here configured as light fixtures by way of example. The system 10 is logically organized in a hierarchical manner represented by Layers L1 to L4 (separated by dashed horizontal lines in the drawing). In this example, the lowest layer L1 of the hierarchy is the layer formed by the intelligent lighting devices, in this case, light fixtures 11. The system 10 also includes a hierarchical arrangement of two or more layers of control computers, represented by various types of host/server computers and user terminal computers in the upper three layers L2 to L4 in the example of FIG. 1.

At the lower level L1, a number of light fixtures 11 are organized into each of several groups; and a first layer or local control system computer communicates with some number of respective groups. In the simple system example of FIG. 1, several light fixtures 11 are logically organized as a first group G1A, and another set of light fixtures 11 are logically organized as a first group G2A. These two groups of light fixtures G1A, G2A communicate with a local control server/host type computer 13A and possibly a local user terminal type computer 15A in the L2 layer via a communication network represented by way of example by the local area network 17A. Similarly, several light fixtures 11 are logically organized as a group G1B, and another set of light fixtures 11 are logically organized as another group G2B. These two groups of light fixtures G1B, G2B communicate with a local control server/host type computer 13B and possibly a local user terminal type computer 15B in the L2 layer via a communication network represented by way of example by a second local area network 17B.

The techniques discussed here are applicable to a wide range of lighting applications/systems/configurations. For example, in some sets of groups, the light fixtures may be outdoor lights such as street lamps or parking lot type lighting devices. In a street lamp example, groups of lighting devices might be those for one or some number of city blocks. For purposes of further discussion of the example of FIG. 1, we will assume that the lighting devices 11 are devices within one or more buildings of one or more enterprises. So, for example, the lighting devices 11 in each of groups G1A and G2A could be the devices for lighting a particular floor or floors of a first building; and the lighting devices 11 in each of groups G1B and G2B could be the devices for lighting a particular floor or floors of another building. In such an enterprise building example, the local host/server computer 13A might serve as a building control system (BCS A) for the first building, whereas the host/server computer 13B might serve as a building control system (BCS B) for the second building, although for other types of local organizations of the fixtures the L2 layer computers may be referred to by other designations such a local control systems or local computer systems. The terminals 15A, 15B would communicate via the network 17A or 17B with the respective BCS A 13A or BCS B 13B, although in some instances, the terminals may also communicate through a network directly with the light fixtures in the respective building or the like.

Although public networks could be used, in the building example, the networks 17A, 17B for communications between the intelligent lighting devices 11 and the respective control computers 13A, 15A, 13B, and 15B in each premises are implemented as local area networks (LANs) within respective buildings. Each LAN may be wired (e.g. metallic or optical fiber), wireless (e.g. radio frequency or free space optical) or a combination of such network technologies. For example, one building may use a wired Ethernet network, whereas another may use a wireless network such as a wireless Ethernet (WiFi) network. A wired network may utilize the lines that supply power to the light fixtures and/or the computers, or a wired local network may use separate optical or electrical network wiring. Of course, different buildings or other groups of intelligent fixtures may use different types of LANs. In an outdoor example, e.g. for implementing intelligent fixtures as street lights, the fixtures may utilize power line communication technology, cellular network transceivers, or a wireless mesh communication network topology.

The BCS type computer may be implemented with any suitable computer platform capable of running desired programming for monitoring and control functions and handling the desired work/traffic load expected for the number of intelligent light fixtures with which the particular system 13A or 13B will be working. Each enterprise or building may have one or more of the user terminals 15A, 15B. The user terminal equipment may be implemented with any suitable processing device that can also offer a suitable user interface. The terminal 15A, for example, is shown as a desktop computer with a wired link into the first LAN 17A, and the terminal 15B is shown as a touchscreen type tablet computer with a wireless link into the second LAN 17B. However, other terminal types, such as laptop computers, notebook computers, netbook computers, and smartphones may serve as the user terminal computers of layer L2.

In the exemplary four tier hierarchy, computers 13A, 13B, 15A and 15B are the first layer computers (in exemplary layer L2) in communication with the light fixtures 11 in layer L1. Depending on the number of lighting devices and installations/locations thereof, there may be control computers in one, two or more higher layers. In our building installation example of FIG. 1, there are any number of buildings with installed light fixtures 11 and associated building control system (BCS) computers within a geographic area or region. The BCS (computers and possibly the terminal devices) in layer L2 communicate with a computer or computers in the higher layer(s) via a network. Hence, in the example, each building installation includes a gateway and/or firewall (GTWY/FW) 19A, 19B enabling communications of the various elements/devices connected to the LANs 17A, 17B via a wide area network (WAN) 21. A GTWY/FW provides the requisite communication interfacing and security enforcement for communications between the routers implementing the LAN and routers of the WAN 21. The WAN 21 may be the public Internet, or a private intranet operated by an enterprise or a service provider. As in the lower layer network communications, the links between the LANs and the WAN may use any available/practical wired or wireless technology or any commercially advantageous (cost effective) combination thereof.

The WAN 21 enables the computers in layer L2 to communicate with computers implementing one or more higher layers L3, L4, etc. of the networked architecture of system 10. For example, some number of BCS computer systems within a particular region or area may communicate with a regional or area control system (ACS) computer at the L3 level. In the illustrated example, the computers BCS A 13A and BCS B 13B communicate via the WAN 21 with a computer system ACS A 23A. Although the lower layer elements are not shown for convenience, in another area, BCS computers would communicate via the WAN 21 with a computer system ACS B 23B serving as the L3 control computer for the second region or area. As represented generally by the tablet computer 25, layer L3 may also include control computers in the form of various user terminal devices of any of the types discussed earlier relative to devices 15A and 15B in layer L2. Depending on secure authorization policies, a user of a terminal such as 25 may interact with either or both of the ACS computers in layer L3, via the WAN 21. Other regions may be served by L2 and L3 host/server computer systems and/or user terminal devices in a similar manner. Each of the computers in layer L3 may be coupled or linked to the network 21 via any suitable wired or wireless technology.

In an example like that shown that encompasses a number of different areas or regions, the area computers (ACSs) 23-25 in layer L3 in turn communicate with one or more computers in a still higher layer L4 of the networked system hierarchy. The communications may utilize a different network, or as illustrated, the computers 23-25 of layer L3 may communicate with the computer(s) of the higher layer L4 via the WAN 21. As the system 10 expands to cover wider geographic areas and to work with larger numbers of lighting devices, the system may be expanded to add further layers to the hierarchy, either in-between the exemplary layers or as still higher layers.

In the four tier example, the L4 layer is the top logical layer. Hence, the example includes a central control system (CCS) computer 27 at that layer. Either in association with or as an alternative to the CCS 27, the L4 layer may include a user terminal 29. Although shown as a desktop terminal 29, the user terminal may be any appropriate type of computer device, as discussed above with respect to terminal devices 15A, 15B and 25 in the L2 and L3 layers. Each of the computers in layer L4 may be coupled or linked to the network 21 via any suitable wired or wireless technology.

Returning to the lower L1 layer in our example, we will next consider the high-level aspects of the intelligent light fixture, with specific reference to elements shown within one of the fixtures in the group G2A. More specific details will be discussed later with regard to several examples shown in FIGS. 2-6.

As shown at a high level in FIG. 1, each lighting device 11 includes a light source 31, a sensor coupling 33 and a sensor 35 for sensing at least one external condition not related directly to operations or communications of the light fixture. The networking and related monitoring and control operations discussed here can be utilized with any desired light source, and different fixtures in the same or different buildings or outdoor locations can utilize different light sources to suit the needs of various lighting applications of the fixtures. Each light fixture 11 may be configured with a single coupling 33 and external condition sensor 35, although the example in FIG. 1 shows two such couplings and sensors in each fixture, e.g. so that each fixture can sense two different external conditions (or the same condition, for example, in different directions or locations around the fixture or to provide a combined reading and thereby improve overall accuracy).

A fixture 11 may include one or more feedback sensors for sensing operational conditions, such as source or circuit temperature, light output intensity, or one or more other characteristics of the light produced by the source, which relate to operation of the fixture. Some or all of the fixtures may have light activation related sensors, such as ON/OFF switches, room occupancy sensors, ambient light sensors for controlling lighting in response to ambient light intensity, and light dimmers. Feedback and light activation sensors are referred to collectively as internal sensors, in that they sense aspects of and/or user inputs to control the internal lighting operations of one or more of the fixtures. In the example, the illustrative fixture in group G2A includes a coupling 37 and at least one internal condition sensor 39.

Each of the light fixtures 11 is configured to sense at least one external condition not related directly to operations or communications of the light fixture. As discussed more later, each fixture also has an interface for communications with other system elements. The condition or conditions detected by sensors 35 are external in that they relate to some aspect observable in the environment around and near the fixture 11 other than those relating to the feedback, normal lighting control and/or communications of the fixture 11. Although more examples will be discussed later, a few examples of conditions that may be detected via external sensing include ambient temperature, humidity, air pressure and wind speed in the surrounding environment; images of nearby objects; motion outside the fixture; gases and other substances in the atmosphere; and temperature and moisture on objects within some distance range of the fixture 11. As such, some of the external conditions, like air temp, air quality, and vibration, relate to ambient conditions around or near the fixture itself; whereas other external conditions, like reflected or directed light, or like an image or a video of a distant object, relate to external remote conditions that exist at some distance from fixture.

A wide variety of sensor devices may be used to sense any one or more of these or other types of external conditions.

For example, the sensor may be an optical device, for sensing one or more characteristics of light in the ultraviolet, visible or infrared portions of the electromagnetic spectrum. Optical devices may be used, for example, for sensing direction of light and determining position of an object as described in U.S. Pat. Nos. 6,043,873 and 5,705,804 both by Ramer et al. Other examples of optical sensors include linear and two-dimensional imaging devices.

By way of another example, a lighting device 11 may include a sensor in the form of a Micro-Electro-Mechanical System (MEMS) for sensing motion, similar to gyroscopic devices used in smartphones and the like to sense orientation, movement and direction. Here, MEMS type sensors would sense magnitude and directions of vibrations of the fixtures 11 due to external forces. Collective analysis, for example, might indicate an earthquake and the area and magnitude of the impact.

The external condition sensor coupling 33 is configured to present a sensor connection interface standardized across at least some number of the lighting devices 11. The standardized connection interface is compatible with different types of external condition sensors 35. Each sensor 35 is connected to the standardized connection interface of the sensor coupling 33. In this way, one configuration of the coupling 33 may be used with different types of sensors. Within any one fixture, there may be one, two or more couplings 33 configured to the same standard as well as one, two or more other couplings 33 configured to one or more additional standards.

Each sensor 35 is a device of one of the types compatible with the standardized interface provided through a standardized coupling 33. The location of each sensor 35 enables sensing of a condition external to the respective lighting device 11, although the condition is not directly related to operational performance of the respective lighting device. Each sensor 35 is configured to output a signal responsive to the particular sensed external condition via the standardized connection interface of the associated sensor coupling 33.

A "sensor" may be as simple as a condition responsive transducer for generating an electrical signal bearing a known relationship to the amount or degree or the like of a particular condition that the transducer detects. However, most implementations, particularly those in the examples, utilize sensors that include at least some circuitry for processing the output of the transducer(s) included as part of the sensor. The circuitry receives the signal from the transducer(s) in the sensor and produces an output via the coupling that conforms to the signaling aspects of the sensor coupling standard, e.g. as a standard analog level signal on one or more pins designated for an analog connection and/or as appropriately formatted data on the pins designated for data outputs. The electronics of such a sensor may also receive and respond to a signal received from the I/O interface on the board.

Each lighting device, in this case each fixture 11, also includes processing and communications elements, represented collectively in the high-level functional block diagram of FIG. 1 by the control/communication (Ctrl./Comm.) board 41. These elements, for example, include a processor, which is coupled to the sensor coupling(s) 33 in the fixture 11, for processing data responsive to the signal from each included external condition sensor 35. If internal sensing is provided, the processor also is coupled to the sensor coupling(s) 37 in the fixture 11, for processing data responsive to the signal from each included internal condition sensor 39.

The elements on the control/communication board 41 also include a memory, accessible to the processor, which stores programming for execution by the processor and data for processing or that has been processed by the processor during program execution. For example, the memory stores a program corresponding at least in part to each type of included external condition sensor 35. Execution of the program controls at least one function of the processor of the light fixture 11 responsive to the external condition sensed by the sensor 35, such as collection of data regarding sensed external condition(s) and related communications with at least one of the higher layer computers of the system 10.

Each light fixture 11 also includes a communication interface accessible by the processor. The communication interface is configured to enable the processor to communicate information resulting from performance of the function of the processor controlled by the program responsive to the sensed condition through the communications network, in the example, through a LAN 17A or 17B.

In the exemplary four tier hierarchy, computers 13A, 13B, 15A and 15B are first layer computers having communications interfaces enabling each of those computers to communicate through the communications networks 17A, 17B with a different respective group of the fixture type lighting devices 11. In this way, each first layer computer can receive information from the processors of its respective groups of lighting devices. At least one of the first layer computers in communication with each group of lighting devices 11 is configured to process the received information to obtain resultant information.

In the exemplary four tier hierarchy, any of the computers 23-25 in layer L3 and/or computers 27-29 in layer L4 would be a second layer computer having a communications interface to communicate through the communications network (WAN 21) to receive the resultant information from first layer computers. The second layer computer is configured to initiate at least one action in response to processing of the resultant information received from the first layer computers.

Each of the various computers in the layers L2 to L4 will run programming to control respective operations thereof including operations for processing condition related data and/or responsive communication and related actions. Although possibly somewhat different in each type of computerized device, each will run an operating system (OS) and one or more applications programs (APs) related to the sensed condition communication and processing functions of the system 10. The OS of a particular type of computerized device will provide an application programming interface (API) to allow various application programs to run on the computerized device via the respective OS and in that way utilize the various resources and functions of the computerized device. For example, the API in computerized devices at one or both the higher layers L3 and L4 of computers enables application programming for processing the condition-related data and initiating the responsive action can be written to the standardized API. In this way, it becomes possible for various parties to write application programs for the higher layer programs to respond to different types of conditions sensed by the lighting devices 11 and support different functions desired by the parties that utilize the system 10.

The computer or computers in layer L4 that receive the processed information from the layer L3 computers can initiate one or more responsive actions. The actions may involve any one or more of a variety of reporting functions, such as sending alerts to terminal devices of users who may need to know or response, generating periodic reports, or the like. The action or actions also may involve generating lighting related commands to send back down through the system 10 to cause one or more of the intelligent lighting devices 11 to modify their operations and/or to sending commands through the system 10 to cause one or more of the intelligent lighting devices 11 to collect and send and additional condition related information.

As outlined above, the external condition monitoring, collection of data obtained and processing of external condition data, from lighting devices 11 over a region or area of significant size admits of a wide range of possible applications for the data. The actions that may be initiated from the high level computer may be as wide ranging as the array of possible applications of the monitoring and data processing capabilities of the system 10. For example, the high level computer(s) may generate maps or other forms of reports relating to conditions existing across the monitored region(s). Where the sensed conditions include atmospheric conditions, such as pollution, a map might show the spread of a particular sensed pollutant allowing government personnel to identify the source, track the spread and/or initiate remedial actions. Weather related data collected at a multitude of street and highway lamps would provide much more granular information about weather conditions than is typically available from remote weather monitoring stations today. The maps or other reports generated at the higher level(s) of the system 19 or portions of such information may be distributed through the network to terminal devices of users throughout the effected area, including devices shown in the lower layers of the system 10. As another map example, if sensing of position of objects near lighting devices or sensing vibration of the lighting devices is processed to determine the occurrence and magnitude of an earthquake, a map might illustrate the relative magnitude of the quake throughout an area impacted by the quake.

To facilitate the data processing, at least the computer(s) at layer L4 have access to information about the positions of the lighting devices 11 to facilitate the relevant processing and related actions. Typically, the position information is known in advance and maintained in a database. Maps of the area(s) or region(s) can be correlated with some or all of the position information. An alternative to the position database would be to include a position detection device, such as a global satellite positioning (GPS) receiver and associated position calculation programming in the lighting devices. This later approach would allow for reporting of position changes, e.g. in response to movement of the fixture if not permanently mounted and/or if taken down and moved for some reason.

As another example of responsive action, the action initiated in the high level computer may relate to further control of lighting operations of one or more of the lighting devices 11. For example, in a situation where the sensed conditions indicate an emergency in a building, the control action may involve sending commands back down through the system 10 to selected lighting devices 11 so as to initiate operations of any number of lighting devices in the effected building, e.g. to help people to evacuate the building and/or to help responders to find the source of the emergency condition.

As noted earlier, another type of action initiated by the high level computer may involve generating commands to send back down through the system 10 to cause one or more of the intelligent lighting devices 11 to collect and send any additional condition related information. To help with damage assessment in the earthquake detection example, these commands might cause lighting devices having image sensors to capture and send back images or videos for assessment.

The elements of the system 10 may be owned and operated by one entity, such an enterprise with multiple buildings distributed over a number of dispersed geographic regions. In a street light example, a counsel of governments for a city and surrounding suburbs may jointly operate the light fixtures and computers to provide unified monitoring and response to one or more conditions in the regions served by the government entities in the council.

However, some of the elements may be operated by different entities. In a building example for diverse building owners, the monitoring service may be provided by an entity operating as a service bureau or provider. In this later case, each building owner would own and operate the light fixtures and LAN in the respective building. The BCS computers and any terminals in layer L1 may be on the premises or remote, and that equipment may be owned by the building owner or the service provider. However, such L1 computers will be configured, at least for the monitoring service, by the entity that provides the monitoring service. The computer(s) at the higher levels would likely be owned and operated by the monitoring service provider, although some may be owned and operated by other entities with whom the service provider has a cooperative agreement, e.g. to a company or government entity that may agree to respond to conditions sensed on premises monitored by the equipment of the service provider.

The discussion here relates to monitoring of one or more conditions external to the lighting devices over a number of premises and/or over a wide geographic area. The intelligence of the devices and the associated feedback sensing, however, allows for a wide range of control functions related to the lighting application as well. For example, the same communication and computer resources can be used to monitor and control the lighting operations of the intelligent lighting devices. For example, the fixtures may report conditions of the sources and fixture electronics to the control system computers and respond to commands from the control system computers to automatically adjust lighting operations. Condition reports generated by a high level computer can be used to advise appropriate personnel to service particular lighting devices, e.g. to replace light source elements and/or other device components when service is appropriate.

The system 10 can utilize lighting devices in a variety of configurations, for various different lighting applications and associated monitoring functions. Most of the discussion of FIG. 1 above assumed that the exemplary devices were configured as fixtures, for example, as might be mounted in our around the exterior of buildings or fixtures for street or parking lot type outdoor lighting. The system 10 may also utilize intelligent light bulbs installed in relatively standard desk, floor or table lamps or in relatively dumb fixtures configured to take light bulbs having standard size and base connections. For this later type of lighting device, the power would come from the lamp or fixture, but the source, couplings, sensor and electronics of the Ctrl./Comm. board forming the intelligent lighting device would be contained within the bulb. Communications would use the power line or wireless transceivers.

To further appreciate the structure and operations of the intelligent lighting devices, it may be helpful to consider some examples. For purposes of illustration and discussion, we will consider exemplary implementations as light fixtures, although as noted, intelligent lighting devices with sensing and communication capabilities may be implemented in other forms.

Figure 2:
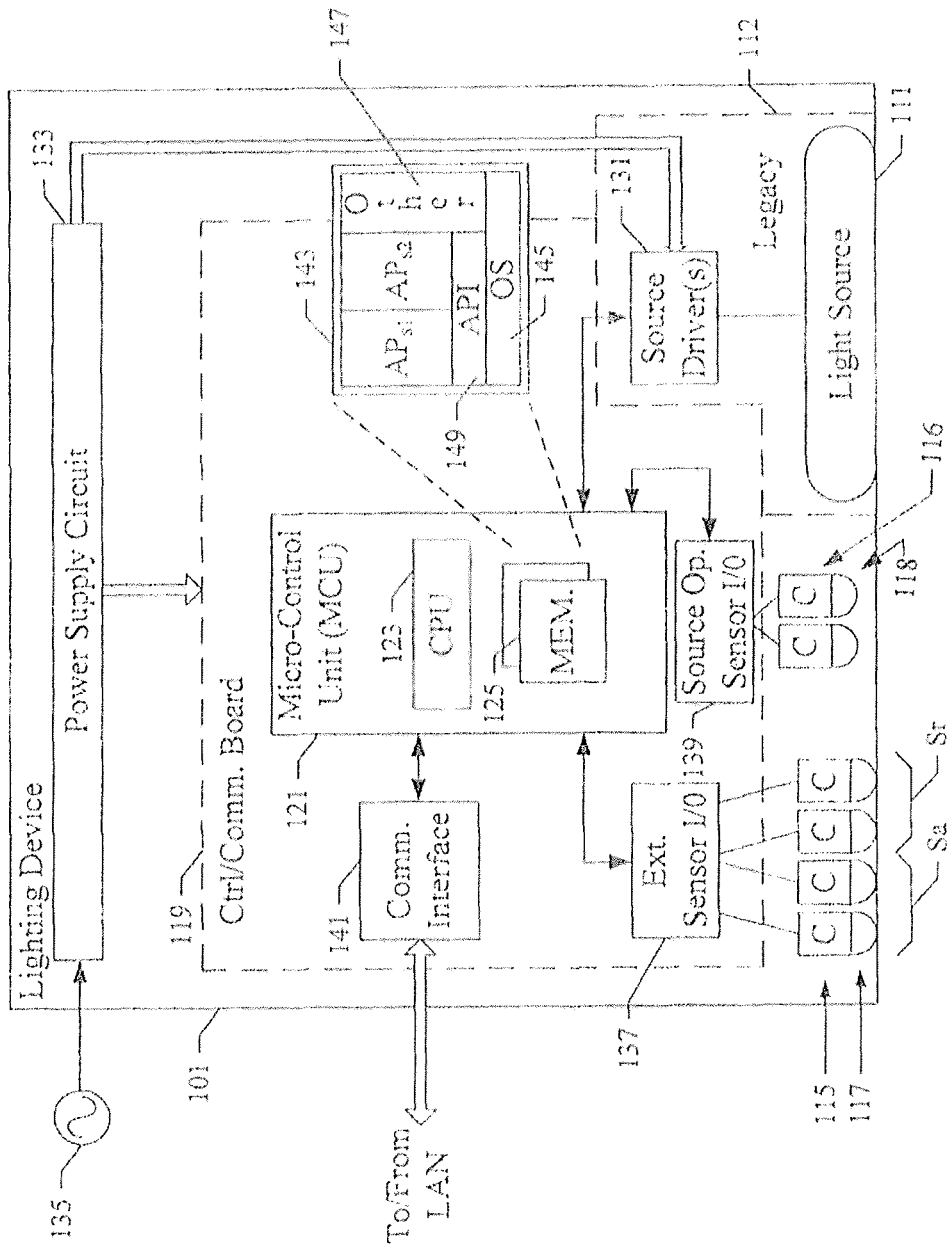
FIG. 2 is a functional block diagram of the elements in a first example of an intelligent lighting device that may be used as one of the lighting devices in the system of FIG. 1.
Figure 3:
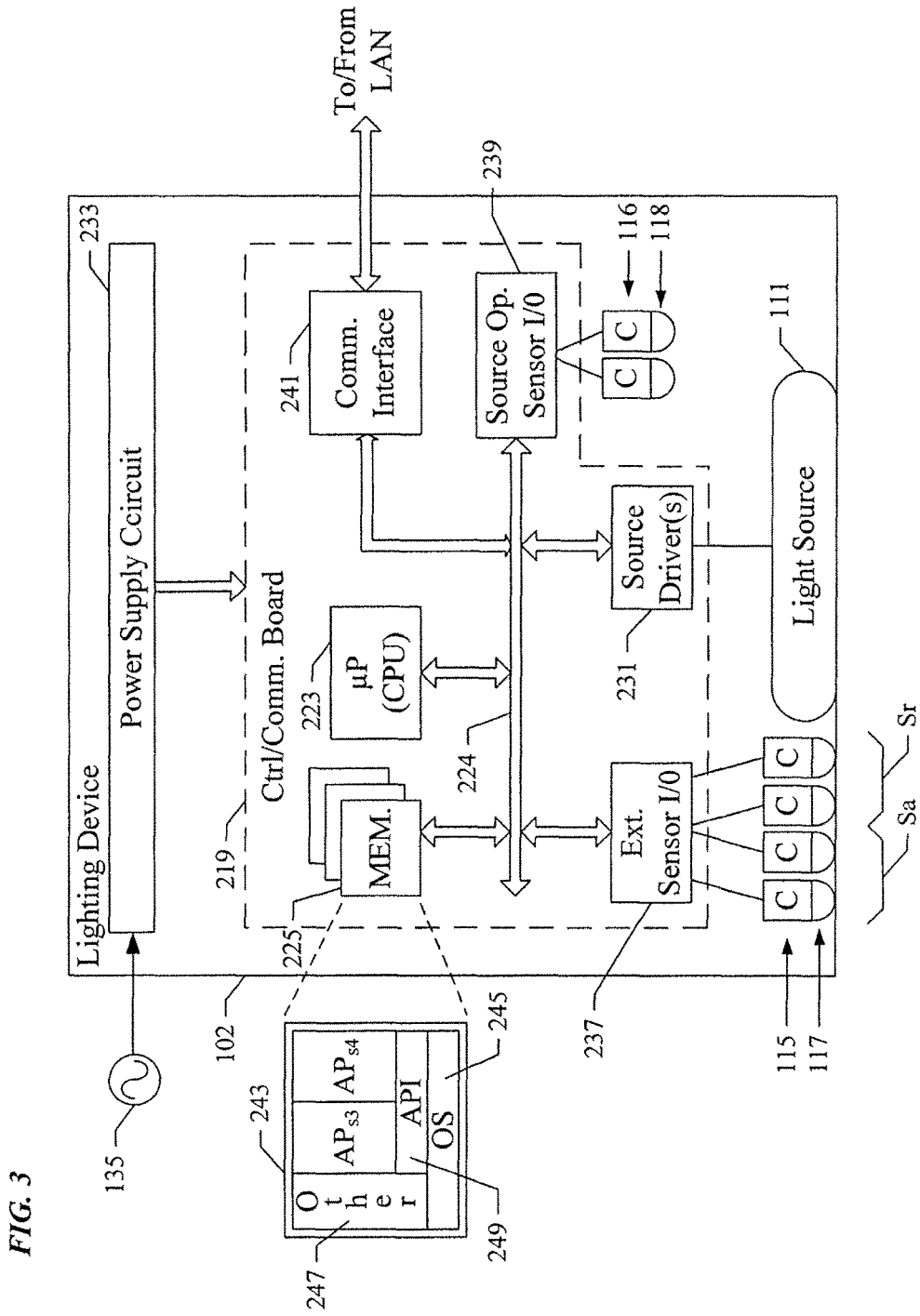
FIG. 3 is a functional block diagram of the elements in a second example of an intelligent lighting device that may be used as one of the lighting devices in the system of FIG. 1.

FIG. 2 shows a first example 101 of an intelligent lighting device based on use of a microcontroller as the device control element, whereas FIG. 3 shows a second example 102 of an intelligent lighting device based on use of a microprocessor (μP) as the device control element. Also, the first example utilizes a legacy light source, whereas the second example utilizes an incorporated source, e.g. as might be used in a new design or installation. Similar elements in these two examples are identified by like reference numerals.

Considering first the example of FIG. 2, the lighting device 101 includes a light source 111 implemented as part of a legacy installation 112. For example, the legacy installation 112 may be an existing type of street lamp or light fixture utilizing an older more conventional type of source. In such a case, some or all of the other elements of the lighting device 101 may be configured as a module coupled to the light source 111 in the legacy installation 112, e.g. as added to a light fixture previously configured to support the light source 111. In the example, the control elements control the light source 111. The light source 111 in the legacy installation 112 could be separately controlled (e.g. by a legacy control system or element, such as a switch). In this later situation, the added elements of the device 101 would mainly provide monitoring and communication functions from the location of the lighting device 101.

The exemplary lighting device 101 includes one or more sensor couplings and one or more sensors as well as communication and control electronics. For the legacy installation 112 of the source 111, the other elements of the lighting device 101 are configured as a module coupled to the light source 111, e.g. as may be added to a light fixture previously configured to support the light source and coupled to the source 111 via existing control and/or power connections of the source.

In the example of device 102 in FIG. 3, the light source 111 is integrated into the fixture or the like, in a unified configuration together with the one or more sensor couplings, one or more sensors and the communication and control electronics. Although the source 111 in the device 102 may be any suitable type of light source, many such devices will utilize the most modern and efficient sources available, such as solid state light sources, e.g. LED type light sources.

Each lighting device 101 or 102 is configured to sense at least one external condition not related directly to operations or communications of the lighting device. As discussed more later, each device also has an interface for communications with other system elements. Hence, a lighting device 101 or 102 may have as few as one coupling 115 and one associated external condition sensor 117. In the examples discussed herein, each lighting device 101 or 102 includes a number of sensor couplings 115 and associated sensors 117.

The condition or conditions detected by sensors 117 are external in that they relate to some aspect observable in the environment around and near the lighting device 101 or 102 other than those relating to the feedback, normal lighting control and/or communications of the device 101 or 102. As noted in the discussion of the network example of FIG. 1, some sensed external conditions, like air temp, air quality, and vibration, relate to ambient conditions around or near the fixture itself; whereas other sensed external conditions, like reflected or directed light, or like an image or a video of a distant object, relate to external remote conditions that exist at some distance from fixture. Hence, the device examples of FIGS. 2 and 3 include one or more sensors Sa of types for sensing or detecting an ambient external condition and one or more sensors Sr of types for sensing or detecting a remote external condition. Examples of external ambient condition sensors Sa include a fire detector, a smoke detector, an airborne chemical detector, an airborne biological agent detector, a carbon monoxide sensor, an air temperature sensor, an air pressure detector, a humidity sensor, a moisture detector, an air speed detector, and a micro-electro-mechanical system type sensor. By way of another example, a lighting device 11 may include an ambient sensor Sa in the form of a Micro-Electro-Mechanical System (MEMS) for sensing motion, similar to gyroscopic devices used in smartphones and the like to sense orientation, movement and direction. Here, MEMS type sensors would sense magnitude and directions of vibrations of the fixtures 11 due to external forces. Collective analysis of vibration measurements, for example, might indicate an earthquake and the area and magnitude of the impact. Examples of external remote condition sensors Sr include a directional light sensor, a video or still image sensor, and a sound detector. Some of the ambient and remote sensors may be optical devices, each for sensing one or more characteristics of light in the ultraviolet, visible or infrared portions of the electromagnetic spectrum. Optical remote condition sensor devices may be used, for example, for sensing direction of light and determining position of an object. Other examples of remote condition optical sensors include linear and two-dimensional imaging devices.

In these examples (FIGS. 2 and 3), each external condition sensor coupling 115 is configured to present a standardized sensor connection interface that is compatible with different types of sensors. In that way, one standardized configuration of the coupling 115 may be used with different types of sensors. Within any one fixture, there may be one, two or more couplings 115 configured to the same standard as well as one, two or more other couplings 115 configured to one or more additional standards. Any sensor connection interface supported through a coupling 115 is standardized across at least a number of different lighting devices 101 or 102 (or 11 in FIG. 1) in that the different devices have similar couplings that support the same connection and associated electrical aspects of the coupling standard. However, the standardized connection interface in the various lighting devices also is compatible with a plurality of different types of sensors. Each sensor 117 connects to the standardized connection interface of one of the sensor couplings 115. Each sensor 117 is a device of one of the types compatible with the standardized interface provided through a standardized coupling 115.

Although the couplings 115 may support two or more standards for the sensors, as noted, for purposes of further discussion of the examples of FIGS. 1 and 2, all of the couplings 115 in one device 101 or 102 provide the same standardized interface for various types of sensors 117. In either of the multi-sensor examples, Sr sensors may sense the same remote condition or different remote conditions. Similarly, the Sa sensors may sense the same or different ambient conditions. Hence, there is at least one first type sensor located so as to sense a first one of a number of conditions external to the lighting device not directly related to operation of the lighting device and at least one second sensor of a second one of the types different from the first type that is located so as to sense a second one of the conditions external to the lighting device not directly related to operation of the lighting device. Each Sa sensor connects to the standardized interface of one of the couplings 115, and each Sr sensor connects to the standardized interface of another one of the couplings 115. Each of the sensors Sa and Sr is configured to output a signal responsive to the respective sensed condition via the standardized connection interface of the respective sensor coupling 115.

Intelligent lighting devices of the type discussed herein may have only the one or more external condition sensors 117. However, the specific examples 101 and 102 illustrated in FIGS. 2 and 3 also include one or more couplings 116 and sensors 118 to detect a condition related to operation of the lighting device. A device 101 or 102 may include one or more feedback sensors for sensing operational conditions, such as source or circuit temperature, light output intensity, or one or more other characteristics of the light produced by the source, which relate to operation of the lighting device. Such sensors may provide a local or internal feedback loop at the lighting device 101 or 102 or may enable communication regarding the additional condition to another device over a network and associated light source control based on receiving responsive commands from the other device. Some or all of the lighting devices may have light activation related sensors, such as ON/OFF switches, room occupancy sensors, ambient light sensors for controlling lighting in response to ambient light intensity, and light dimmers. Feedback and light activation sensors are referred to collectively as internal sensors, in that they sense aspects of and/or user inputs to control the internal lighting operations of one or more of the lighting devices. Examples of sensors 118 to detect a condition related to operation of the lighting device 101 or 102 include a sensor for detecting temperature of one or more components of the lighting device, a feedback light sensor for detecting intensity or other characteristic of light produced by the lighting device, an occupancy sensor for detecting a condition indicative of occupancy of a region to be illuminated by the lighting device and an ambient light sensor for detecting ambient light near the lighting device. In the examples of FIGS. 2 and 3, the illustrative devices 101 and 102 each include one or more couplings 116 and one or more internal condition sensors 118.

The couplings 116 may be standardized in a manner similar to the couplings 115, or the couplings 116 may be uniquely configured for each respective type of sensor 118. In the example, we will assume that the couplings 116 present a standardized sensor connection interface that is compatible with different types of internal condition sensors. The standard may be the same as or different from the standardized interface(s) of couplings 115. Each sensor 118 in turn is configured to connect to and provide condition responsive signaling via the standardized interface of the coupling 116. As noted in the discussion of FIG. 1, this third category of sensor provides signal(s) used to enable control of operation of the light source at least in part based on the condition(s) sensed by the sensor(s) 118.

Each exemplary lighting device 101 or 102 also includes a processor coupled to the sensor couplings 115 for processing data responsive to the signals from the sensors 117. However, the two examples utilize different processor implementations.

Consider first the example of FIG. 2. There, the lighting device 101 also includes processing and communications elements, in this case implemented on a control/communication (Ctrl./Comm.) board 119. The lighting device 101 includes a Micro-Control Unit (MCU) 121, which implements the control logic for the device 101, that is to say, controls operations of the device 101. The MCU 121 may be a microchip device that incorporates a processor serving as the programmable central processing unit (CPU) 123 of the MCU and thus of the lighting device 101 as well as one or more memories 125 accessible to the CPU 123. The memory or memories 125 store executable programming for the CPU 123 as well as data for processing by or resulting from processing of the CPU 123. The MCU 121 may be thought of as a small computer or computer like device formed on a single chip. Such devices are often used as the configurable control elements embedded in special purpose devices rather than in a computer or other general purpose device. A variety of PIC16 and PIC32 type MCU chips, for example, may be used as the MCU 121 in the lighting device 101.

As noted, the lighting device 101 includes a source 111, which in the example of FIG. 2 is part of a legacy type installation 112. Power is supplied to the source 111 by an appropriate driver 131. The source driver 131 may be a simple switch controlled by the MCU, for example, if the source 111 is an incandescent bulb or the like that can be driven directly from the AC current. Although the driver 131 could be an element on the control/communication (Ctrl./Comm.) board 119, in the example, the source driver 131 is a part of the legacy installation 112 of the source 111, for example, the ballast in an otherwise conventional fluorescent light fixture. Power for the lighting device 101 is provided by a power supply circuit 133 which supplies appropriate voltage(s)/current(s) to the control/communication (Ctrl./Comm.) board 119 and provides appropriate power to the source driver 131 to power the light source 111. Although shown separately for convenience, the components of the power supply circuit 133 may be mounted on the same board 119 as the control and communication components, depending on considerations such as board/housing space, heat generation, etc. In the example, the power supply circuit 133 receives electricity from alternating current (AC) mains 135, although the lighting device may be driven by a battery or other power source for a particular application. Although not shown, the device 101 may have or connect to a back-up battery or other back-up power source to supply power for some period of time in the event of an interruption of power from the AC mains 135.

The source driver circuit 131 receives a control signal as an input from the MCU 121, to at least turn the source 111 ON/OFF. Depending on the particular type of source 111 and associated driver 131, the MCU input may control other characteristics of the source operation, such as dimming of the light output, pulsing of the light output to/from different intensity levels, color characteristics of the light output, etc. If the source and/or driver circuit have the capability, the driver circuit 131 may also provide some information back as to the operation of the light source 111, e.g. to advise the MCU 121 of the actual current operating state of the source 111.

As outlined earlier, the lighting device 101 includes external condition sensors 117 connected to standardized couplings 115 as wells as sensors 118 for sensing conditions related to operations of the source 112 and associated sensor couplings 116. The couplings 115, 116 provide physical connections, electrical signal connections and any power connections that may be necessary to the respective sensors 117, 118. Physical and electrical connection aspects of each coupling 115, 116 will conform to relevant aspects of the applicable sensor coupling standard. The electrical power and electrical signal communication from and/or to the sensors, in accordance with the electrical aspects of the applicable sensor coupling standard, are provided by appropriate input/output (I/O) circuitry connected between the coupling and the MCU 121. On the MCU side, the I/O circuitry provides a signaling link to a port of the MCU 121 and conforms to the signaling standard for that port. Depending on the design implementation for a particular lighting device 101, I/O circuitry may include a separate circuit for each coupling, two or more I/O circuits for groups of two or more couplings or one I/O circuit for all of the included sensor couplings. In the example of FIG. 2, the I/O circuitry for the sensor couplings 115 is represented by the external sensor input/output (I/O) interface 137; and the I/O circuitry for the sensor couplings 116 is represented by the source operations sensor input/output (I/O) interface 139.

Hence, together, the coupling 115 and the external sensor I/O interface circuitry 137 provide physical and electrical connections as well as electrical power and signal communications for an external condition sensor 117 that conform to the applicable sensor connection interface standard. The signal communications aspects of the standard at least allow the sensor 117 to provide external condition responsive information to the MCU 121. Although the actual sensing element of a sensor may be analog, the information passed to the MCU 121 will typically be in a standardized digital format. The digital format, however, may vary somewhat as between sensor types, based on associated application programming discussed more, later. Preferably, the MCU port connection, the I/O interface circuitry 137 and the interface standard through the coupling 115 also will allow the MCU to control one or more aspects of operation of the sensor 117, e.g. to activate a sensor to sense the applicable condition at a time set by the MCU 121, or to select one of several conditions to be sensed by a multi-condition type of sensor 117, or to adjust a sensitivity of the sensor 117, etc.

As noted, in the examples, the couplings 116 also support a standardized interface that may be the same as or similar to the interface of the couplings 115. Hence, together, the coupling 116 and source operation-related sensor I/O interface circuitry 139 provide physical and electrical connections as well as electrical power and signal communications for a source operation-related sensor 118 that conform to the applicable sensor connection interface standard. The signal communications aspects of the standard at least allow the sensor 118 to provide source operation-related condition responsive information to the MCU 121. Although the actual sensing element of a sensor may be analog, the information passed to the MCU 121 will typically be in a standardized digital format. The digital format, however, may vary somewhat as between sensor types, based on associated programming. The MCU port connection, the I/O interface circuitry 139 and the interface standard through the coupling 116 may allow the MCU to control one or more aspects of operation of the sensor 118, e.g. to activate a sensor to sense the applicable condition at a time set by the MCU 121, or to select one of several conditions to be sensed by a multi-condition type of sensor 118, or to adjust a sensitivity of the sensor 118, etc.

The lighting device 101 also includes a communication interface 141 coupled to a communication port of the MCU 121. The interface 141 provides a communication link to a telecommunications network that enables the MCU 121 to send and receive digital data communications through the particular network. The network may be wired (e.g. metallic or optical fiber), wireless (e.g. radio frequency or free space optical) or a combination of such network technologies; and the interface 141 in a particular installation of the device 101 will correspond to the most advantageous network available (based on considerations such as cost and bandwidth) at the location of the installation. In network example of FIG. 1, the network is a local area network (LAN) 17A or 17B, therefore the communication interface is of a type for linking to and communication through the available LAN. The communication interface 141 is therefore accessible by the processor/CPU 123 of the MCU 125, and the communication interface 141 is configured to enable the processor to communicate information resulting from one or more functions that the processor performs in response to the various conditions sensed by the sensors 116 and/or 117 through the LAN or other communications network.

As noted, the MCU 121 includes one or more memories 125. The memories 125 store programming for execution by the CPU 123 as well as data to be processed or that has been processed by the CPU 123. The programming is shown in block diagram or module form as a program stack at 143.

The programming 143 includes an operating system (OS) 145 and various application programs, which are resident in the memory and execute on the CPU. The operating system 145 enables execution of the various applications, both for local functions and for communications using the interface 141. Of note for purposes of this discussion, the application software includes the software for implementing the control of the lighting device as well as the software for MCU interaction with the various connected sensors. For discussion purposes, the example shows two application programs $AP_{s1}$, $AP_{s2}$, for controlling lighting device operations with respect to two different types of sensors. One type of sensor may be for one or more of the source operation-related condition sensors 118, but in this example, we will assume that the sensor application program $AP_{s1}$ controls operations in relation to a type of one of the ambient external condition sensors Sa, and the sensor application program $AP_{s2}$ controls operations in relation to a type of one of the remote external condition sensors Sr. Application programs, such as $AP_{s1}$, $AP_{s2}$, are examples of programming for execution by the processor that corresponds at least in part to the type(s) of sensors and controls at least one function of the processor responsive to the condition(s) sensed by the sensor(s). The CPU 123 also will run one or more other application programs 147 from memory 125, to control various other functions of the lighting device 101, such as control of the light source 111, interaction with other types of sensors 118 or 117, and communications through the interface 141.

The programming 143, either as part of the OS 145 or as a complement to the OS 145, implements a standard application programming interface (API) 149 for at least the application programs(s) APs relating to external condition sensing. Although not separately shown, the programming 143 may implement the same or different APIs for applications related to the source operation-related condition sensors 118 and/or other applications to be executed through the OS 145 by the CPU 123. An API, such as 149, provides a standard software interface for exchanges between software components, allowing components to communicate and interact. An API standard, for example, can specify command formats, response formats, data structures, etc. In this case, the standard sensor API 149 offered or supported by the OS 145 allows various parties, such as different sensor manufactures, to write application programs AP for the MCU 121 to allow the device 101 to utilize different external condition sensors 117.

The application programs AP and the API 145 also enable the MCU 121 to communicate information or data generated in response to processing of signals or outputs of the sensors 117 so as to implement a standardized application programming interface with respect to the sensor related processing function(s). The information resulting from processing functions of the MCU in turn is communicated through the interface 141 and the network in a manner conforming to the standardized application programming interface. In this way, various devices 101 communicate data relating to various types of sensors through the network in a standardized format that can be readily processed by other equipment that is aware of the format supported by the application programming interface.

Hence, each application program $AP_{s1}$ or $AP_{s2}$ controls one or more functions of the processor (CPU) 123 responsive to the external condition or conditions sensed by the respective type of sensors 117. For example, the programming may control how data regarding the sensed conditions is collected, processed and formatted for communication, e.g. so as to conform to relevant aspects of the standard interface specification and associated API. The programming 143 may also configure the processor/CPU 123 to control the light source 111, either based on internal logic or based on commands received at the device 101 via the network communication. Each application program $AP_{s1}$ or $AP_{s2}$ may control operation in relation to a single one of the sensors 117 or in relation to some number of two or more of the sensors 117 and/or 118.

The application program corresponding to a particular type of sensor enables the processor 123 to receive data representing the condition sensed by the sensor 117 and controls at least one function of the CPU 123 responsive to the condition sensed by the sensor, such as processing of the data for communication via the interface 141 and the network. The control function(s) implemented by execution of the application program for a particular type of sensor may involve other logic in addition or instead of processing for communications. For example, the application program may determine timing for detecting a particular condition or for activating or responding to a particular sensor, e.g. on a periodic basis so as to reduce processing load and/or communication traffic. As another example, the control function relating to a particular condition may involve a threshold, either of a value or a change regarding the sensed condition. A program might cause the MCU 121 to react to detection of more than some set amount of a chemical in the atmosphere as an indication of a harmful condition or to update a reported temperature when the temperature has changed more than a threshold amount. The open nature of the lighting devices 101, provided by the sensor interface and associated API supports use of a wide range of sensor types and an even wider range of program logic for different networked applications of such devices.

Consider next the alternative example of a lighting device 102 shown in FIG. 2. The alternative example of a lighting device 102 includes a somewhat similar source 111. As noted earlier, the source is a new source integrated in a new installation type implementation of the device 102. Although the driver 231 for the source 111 could be separate, in the example, the source driver circuitry 231 may be implemented as part of the control and communication board 219 as shown. As discussed earlier, the lighting device 102 also includes the sensors 118, 117 and couplings 115, 116 as in the device 101 of FIG. 2. Many of the functions/operations of the device 102 are similar to those of device 101, however, the lighting device 102 utilizes a somewhat different control architecture than the MCU based arrangement of the device 101 shown in FIG. 2.

Hence, in the lighting device 102 of FIG. 3, the processing and communications elements on the control/communication (Ctrl./Comm.) board 219 include a microprocessor (μP) 223, which serves as the programmable central processing unit (CPU) of the lighting device 102. The μP 223, for example, may be a type of device similar to microprocessors used in servers, in personal computers or in tablet computers or other general purpose computerized devices. Such a device typically offers more and faster processing capabilities than the CPU of a Micro-Control Unit 121 like that used in the device 101. Unlike the Micro-Control Unit, program and data storage is external; and instead of specially configured ports, the μP 223 is typically configured to communicate data at relatively high speeds via one or more standardized interface buses, represented generally by the bus/arrow 224.

The lighting device includes one or more storage devices, which are accessible by the μP 223 via the bus 224. Although the lighting device 102 could include a hard disk drive or other type of disk drive type storage device, in the example, the device 102 includes one or more memories 225. Typical examples of memories 225 include read only memory (ROM), random access memory (RAM), flash memory and the like. In this example, the memory or memories 225 store executable programming for the μP 223 as well as data for processing by or resulting from processing of the μP 223.

As noted, the lighting device 102 includes a source 111, which in the example of FIG. 3 is an integral part of the device 102. Power is supplied to the source 111 by an appropriate driver 231, in this example, included as a component on the control/communication (Ctrl./Comm.) board 219. Although represented as a single element in the drawing, the driver may comprise a number of elements offering several control channels for different elements of the light source 111. For example, a light emitting diode (LED) implementation of the light source 111 may have individually controlled LEDs or strings of LEDs; and for such an implementation, the driver 231 would consist of several driver circuits providing corresponding independent channels of control. The source driver 231 provides a source of power and associated control by the CPU, in this case by the μP 223, similar to the functions provided by the driver 131 in the device 101 of FIG. 2, except that the driver 231 includes a bus interface that enables the μP 223 to communicate with the source driver 231 via the bus 224.

The lighting device 102 includes a power supply circuit 233 coupled to the AC mains 135, like the supply circuit in the example of FIG. 2, although the circuit 233 and the board 219 will be configured to supply diver voltage/current to the source driver 231 via the board instead of the separate path shown in the example of FIG. 2. As in the earlier example, the lighting device may be driven by a battery or other power source for a particular application, or an AC powered device 102 may have or connect to a back-up battery or the like to supply power for some period of time in the event of an interruption of power from the AC mains 135.

The source driver circuit 231 receives control commands from the μP 223 via the bus 224, to at least turn the source 111 ON/OFF. Depending on the particular type of source 111 and the associated driver 231, the μP 223 commands may control other characteristics of the source operation such as dimming of the light output, pulsing of the light output to/from different intensity levels, color characteristics of the light output, etc. If the source and/or driver circuit have the capability, the driver circuit 231 may also provide some information back as to the operation of the light source 111, e.g. to advise the μP 223 of the actual current operating state of the source 111.

As noted, the lighting device 102 includes external condition sensors 117 connected to standardized couplings 115 as wells as sensors 118 for sensing conditions related to operations of the source 112 and associated sensor couplings 116. The couplings 115, 116 provide physical connections, electrical signal connections and any power connections that may be necessary to the respective sensors 117, 118. Physical and electrical connection aspects of each coupling 115, 116 will conform to relevant aspects of the applicable sensor coupling standard(s). The electrical power and electrical signal communication from and/or to the sensors, in accordance with the electrical aspects of the applicable sensor coupling standard, are provided by appropriate input/output (I/O) circuitry connected between the coupling and the bus 224, much like in the earlier example of FIG. 2.

Hence, the lighting device 102 includes external sensor I/O circuitry 237 and source operation-related sensor I/O circuitry 239. With respect to the respective sensors and couplings, the I/O circuits are similar to the circuits 137 and 139 in the example of FIG. 2. However, each of the circuits 237 and 239 includes a bus interface that enables the µP 223 to communicate with the respective I/O interface circuit 237 or 239 via the bus 224. Each of the circuits 237 and 239 may be configured to provide the electrical interface for one, two or more of the respective sensors via the associated coupling(s).

The lighting device 102 also includes a communication interface 241, which is similar to the communication interface 141 in the earlier example, in that the communication interface 241 provides two way data communication via a network such as a LAN. In the example of FIG. 3, the communication interface 241 is of a type having a bus interface to enable the interface 241 to communicate internally with the µP 223 via the bus 224.

As noted, the lighting device 102 includes one or more memories 225 accessible via the bus 224; and those memories 225 store programming 243 for execution by the µP 223 as well as data to be processed or that has been processed by the µP 223. The programming 243 includes an operating system (OS) 245, an application programming interface (API) 249, sensor type specific applications such as $AP_{s3}$ and $AP_{s4}$, and other application programming 247, similar to the programming 143 included in the earlier example. However, here, the programming 243 (particularly OS 245 and API 249) is of a type written for the particular type of µP 223. The sensor type specific application programs $AP_{s3}$ and $AP_{s4}$ would be written to conform to the API 249 and to the particular types of sensors included in the lighting device 102.

Again, application programs, such as $AP_{s3}$, $AP_{s4}$, are examples of programming for execution by the processor that corresponds at least in part to the type(s) of sensors and controls at least one function of the processor responsive to the condition(s) sensed by the sensor(s). The µP 223 also will run one or more other application programs 247 from memory 225, to control various other functions of the lighting device 102, such as control of the light source 111, interaction with other types of sensors 118 or 117, and communications through the interface 241.

At least for the external condition sensors 117 and possibly for the source operation-related condition sensors 118, the API 249 provides the standard software interface of the OS to the application programs AP, as in the earlier example. The application programs AP and the API 245 also enable the µP 223 to communicate information or data generated in response to processing of signals or outputs of the sensors 117 so as to implement a standardized application programming interface with respect to the sensor related processing function(s). The resulting information in turn is communicated through the interface 241 and the network in a manner conforming to the standardized application programming interface. In this way, various devices 102 communicate data relating to conditions sensed by various types of sensors 117 and/or 118 through the network in a standardized format that can be readily processed by other equipment in the higher layers of the system 10 of FIG. 1 that is aware of the format supported by the application programming interface.

Each application program $AP_{s3}$ or $AP_{s4}$ corresponding to a particular type of sensor enables the µP 223 to receive data representing the condition sensed by the sensor 117 and controls one or more functions of the µP 223 responsive to the external condition or conditions sensed by the respective type of sensors, in a manner similar to the application programs AP in the earlier example.

The examples of FIGS. 1-3 utilized monitoring, control and communications elements that were substantially integrated with the fixture and fairly closely coupled to the light source of the fixture. In those examples, elements were provided that sensed conditions related to light source operation and could respond based on internal logic and/or commands from higher level control computers (e.g. to control the light source). However, other configurations are contemplated, for example, that may not utilize the elements on the board to control the light source, may provide additional output or control capability based on internal logic and/or commands from higher level control computers and/or to provide communication connectivity to other devices in the vicinity (e.g. for communication of other devices through the network(s) of FIG. 1). In many cases where there is an installed base of light fixtures, it may be practical to add a module providing monitoring and communication capabilities to each existing fixture to add the desired intelligence, etc.

Figure 4:
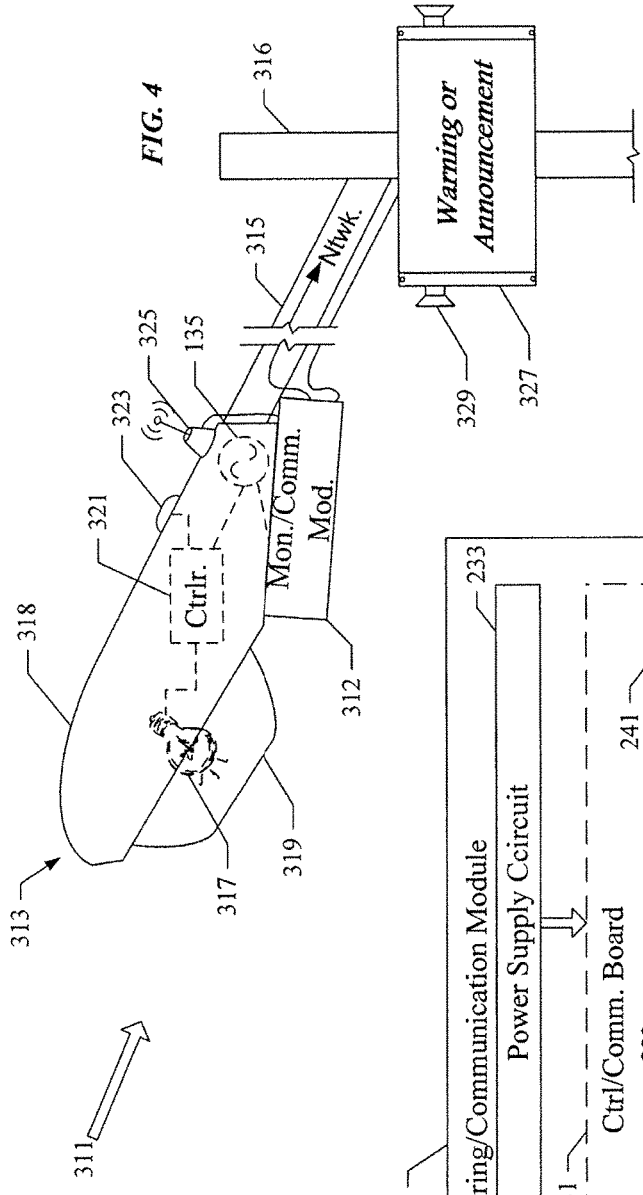
FIG. 4 illustrates another intelligent lighting device that may be used as one of the lighting devices in the system of FIG. 1.
Figure 5:
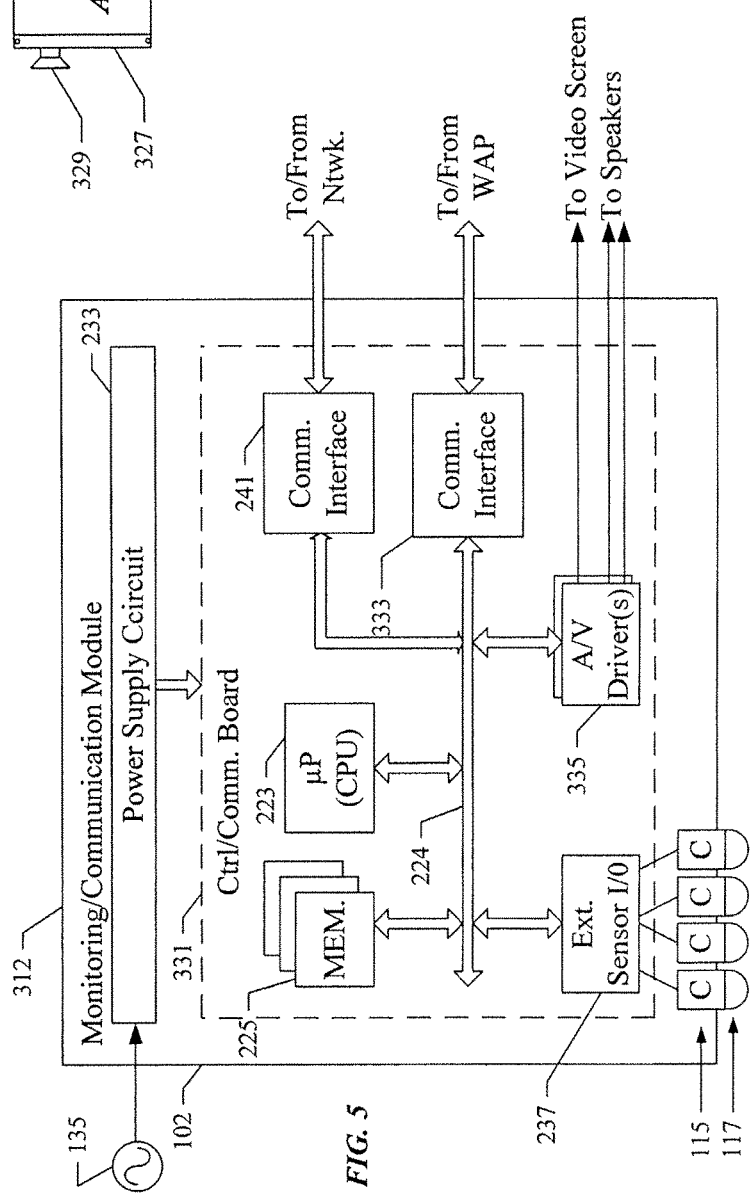
FIG. 5 is a functional block diagram of a monitoring and communication module used in an example of an intelligent lighting device like that of FIG. 4.

FIGS. 4 and 5 relate to such an example of a lighting device 311 in which the monitoring and communication elements are implemented in a module 312 separate, which is attached to or mounted in the vicinity of a light fixture 313. However, the light fixture 313 in this example is a legacy fixture, and the elements within the module 312 do not control the light source 314 included with the associated fixture 313. The light fixture 313 and the module 312 together, in this example, form the lighting device 311. FIG. 4 shows the elements of the lighting device 311, whereas FIG. 5 is a block diagram illustration of the electronic elements of the monitoring and communication module 312.

The example of FIG. 4 utilizes a cobra-head type device as the light fixture 313. The cobra-head fixture is attached to a beam or arm 315 supported by a lamp post or light pole 316, although other mounting structures may be used. Light fixture implementations and mounting arrangements like those shown in FIG. 4 are common in street and parking lot applications. Of course, the monitoring and communication module 312 of FIG. 4 and FIG. 5 may be used with other types of legacy light fixtures and/or in other types of applications.

The light fixture 313 may include any light source 317 that is appropriate for the intended lighting application. The fixture includes a housing 318 that encloses the light source and other elements and provides the mechanical attachment to the supporting beam 315. The housing 318 also supports a transparent or diffusely transmissive cover 319 through which the source 317 emits light.

As in earlier examples, electrical power is obtained from alternating current (AC) mains 135, although the light source 317 may be driven by a battery or other power source for a particular application. AC power lines typically extend up through the pole 316 and the beam 315 and connect to the fixture 313, although such lines are omitted for ease of illustration.

The lighting device 311 also includes a controller 321 for controlling operation of the light source 317. The controller 321 could be external, but in the example, the housing 318 also encloses the controller 321.

Although other more sophisticated control functions may be provided by an appropriate implementation of the controller 321, for discussion purposes, we will assume that the controller simply switches power to the source 317 ON and OFF. Depending on the type of light source 317, the controller 321 may include power conversion circuitry such as a ballast or the like to convert the power obtained from the AC mains 135 to an appropriate voltage/current power for the particular light source 317.

The ON/OFF switching by the controller 321 may be based on a simple input switch, commands received from an external device via the power lines or another device, etc. In the example, the light fixture 313 includes a light sensing transducer 323, such as a photocell. The transducer 323 provides a signal that is related to the intensity of daylight reaching the transducer on the exterior of the fixture 313. The controller 321 in the example turns power to the light source 317 ON when the intensity of light detected by the transducer 323 falls to or below a threshold, e.g. to turn ON the source 317 as night is falling. Conversely, the controller 321 turns power to the light source 317 OFF when the intensity of light detected by the transducer 323 reaches a threshold, e.g. to turn OFF the source 317 as the sun rises in the morning. The source is kept ON in the dark of night, and the source is kept off during the daytime when sunlight is fairly plentiful.

In this example, the cobra head light fixture 313 is configured and operates in a conventional manner. The fixture may be an existing device that need not be modified, with respect to power and operational control.

In an implementation where the fixture 313 is a legacy device, the fixture is enhanced or upgraded by the addition of the monitoring and communication module 312. In the example, the module 312 is mounted by attachment to an underside surface of the housing 318 of the cobra head fixture 313. However, the module 312 may be added and mounted in association with the fixture 313 at any location and/or in any manner that is suitable for a particular installation and/or a particular application.

Existing light fixtures such as the fixture 313 have connection to power, represented by the AC mains 135 in the drawing. The module 312 could be supplied power in other ways from other sources, but typically, the module 312 will utilize the existing source of power available at the light fixture, eliminating the need for separate power and/or wiring. Hence, in the example, the module 312 connects to and obtains power from the AC mains already present in the lighting device for powering the light source 317. Although other connections may be used, e.g. depending on the location and/or mounting of the module 312, in the example, the module 312 has a connection to the AC main lines power 135 at a point in the housing of the cobra head light fixture 313.

The monitoring and communication module 312 is a layer L1 lighting device and communicates through a network with L1 layer computers, and data is processed and communicated with the higher layer networks/computers, in the hierarchical system of FIG. 1. Since the networks and control computers of the hierarchy are the same as or similar to those in the earlier example, those system elements are omitted from the illustration and further discussion with respect to the example of FIGS. 4 and 5. With respect to FIG. 4, the simplified illustration shows a network link to/from the monitoring and communication module 312. This link may be wireless, although in the example it is a hard link such as a wire or optical network cable. Any suitable link may be used.

The monitoring and communication module 312 may perform sensor responsive monitoring and related communications only. However, for at least some system installations, it may be desirable to add further functional elements on or near the fixture that operate in some manner via the monitoring and communication module 312. In the example of FIGS. 4 and 5, the additional elements include a local wireless transceiver 325, such as a WiFi access point. The module 312 provides connectivity for the WiFi local wireless data transceiver 325 to the data network used by the module 312. In this way, the lighting device may provide a hotspot for Internet access or the like in the vicinity of the lighting device 311. By providing modules 312 and WiFi access points 325 on various street lamps around a city or enterprise campus, the city or campus can offer outdoor wireless Internet service, e.g. as a public service and/or for use by city or enterprise personnel.

The additional or ancillary devices provided in the vicinity of the light fixture may also include any of a wide range of devices that may be controlled via communications through the network and the monitoring and communication module 312 of the lighting device 311. Just by way of one example, such added equipment on one or more lighting devices 311 may be used to provide information to people in the vicinity of the fixture 313. Messages could be provided via the WiFi access point 325 to user data devices, or by a Bluetooth transceiver (not shown) for example to equipment in passing vehicles.

In the illustrated example, the additionally controlled equipment includes a visible message output device, such as a video monitor or digital sign board, represented generally by the video screen 327. The data network enables communications of commands and/or data to the module 312 to control information output via the video screen 327. The video screen 327, for example, may provide advertising or other information of general interest; or as shown by way of example, the screen may be used to provide a warning of danger or an announcement of instructions to the public in the vicinity of the lighting device 311.

The device 311 may also offer audible information output, and for that purpose, the exemplary device 311 also includes one or more loudspeakers 329. Much like for operation of the video screen 327, the data network enables communications of commands and/or data to the module 312 to control information output via the one or more loudspeakers 329, for any particular purpose deemed suitable by the service provider/operator of the system of FIG. 1.

Turing now to FIG. 5, we next consider an example of an implementation of the monitoring and communication module 312. The module 312 could be implemented using an MCU based architecture similar to that used in the example of FIG. 2. For purposes of an illustrative example for discussion here, however, FIG. 5 shows an architecture for the module 312 that is based on a microprocessor (µP) and bus architecture similar to that of the example of FIG. 3. Hence, elements shown in FIG. 5 that are the same as elements shown in the example of FIG. 3 use the same reference numerals and are discussed again here more briefly, since the reader should be familiar with or able to refer back to the earlier discussion of such elements for additional information regarding such similar elements.

The monitoring and communication module 312 includes a power supply circuit 233 coupled to the AC mains 135, like the supply circuit in the example of FIG. 3. As in the earlier examples, the module 312 may be driven by a battery or other power source for a particular application, or an AC powered device 312 may have or connect to a back-up battery or the like to supply power for some period of time in the event of an interruption of power from the AC mains 135.

The power supply circuit 233 provides appropriate power to drive the various elements on the control and communication board 331. The power supply circuit 233 may be mounted on the board 331 or a separate unit as shown.

The processing and communications elements on the control/communication (Ctrl./Comm.) board 331 include a microprocessor (µP) 223, which serves as the programmable central processing unit (CPU) of the module 312. The µP 223 is configured to communicate data via one or more standardized interface buses, represented generally by the bus/arrow 224. The monitoring and communication module 312 also includes one or more storage devices, which are accessible to the µP 223 via the bus 224. Although the module 312 could include a hard disk drive or other type of disk drive type storage device, in the example, the device 102 includes one or more memories 225, such as ROM, RAM, flash memory or the like. In this example, the memory or memories 225 store executable programming for the µP 223 as well as data for processing by or resulting from processing of the µP 223. Although not shown in this latest drawing for convenience, the programming stored in the memory or memories 225 include the operation system as well as the application programs (AP) for use with specific sensors.

The monitoring and communication module 312 also includes a communication interface 241, which is similar to the communication interfaces in the earlier examples, in that the communication interface 241 provides two way data communication via an external network such as a LAN. In the example of FIG. 5, like that of FIG. 3, the communication interface 241 is of a type having a bus interface to enable the interface 241 to communicate internally with the µP 223 via the bus 224.

In this example (FIGS. 4 and 5), the monitoring and communication module 312 also supports local wireless communication. As noted in the discussion of FIG. 4, the specific example uses a WiFi type wireless access point transceiver 325 for local wireless data communication with data devices in the vicinity of the intelligent lighting device 311. Hence, the monitoring and communication module 312 includes a second communication interface 333. The interface 333 would be of a standard type configured for local communications with the particular type of device 325. In the example WiFi type example of these drawings, the second communication interface 333 would typically be an Ethernet type LAN interface. An Ethernet cable would provide a connection from the interface 333 in the module 312 to the WiFi type wireless access point 325. Like the interface 241, the second communication interface 333 is of a type having a bus interface to enable the interface 333 to communicate internally with the µP 223 and/or the interface or other elements of the board 331 via the bus 224. For example, under control of the µP 223 when executing programming from the memory or memories 225, the interfaces 333 and 241 may provide two-way data communications for devices utilizing the WiFi type wireless access point 325 to access the Internet. The WiFi type wireless access point 325 and the second communication interface 333 may also enable data devices in the vicinity (with appropriate access privileges) to access the µP 223, e.g. to obtain monitoring data, module operational information or the like and/or to provide control commands and/or new programming to the module 312.

As in the lighting devices in the earlier examples, the lighting device 311 includes external condition sensors 117 connected to standardized couplings 115. In this case the couplings 115 are part of the module 312; and the sensors 117 are attached to and supported together with the module 312. The couplings/sensors could be mounted separately and connected to the module 312. The couplings 115 provide physical connections, electrical signal connections and any power connections that may be necessary to the external condition sensors 117. Physical and electrical connection aspects of each coupling 115 will conform to relevant aspects of the applicable sensor coupling standard(s). The electrical power and electrical signal communication from and/or to the sensors 117, in accordance with the electrical aspects of the applicable sensor coupling standard, are provided by appropriate input/output (I/O) circuitry 237 connected between the coupling and the bus 224, as in the earlier example of FIG. 3. The external sensor I/O circuitry 237 includes a bus interface that enables the µP 223 to communicate with the respective I/O interface circuit 237 via the bus 224. The external sensor I/O circuitry 237 may be configured to provide the electrical interface for one, two or more of the sensors 117 via the associated coupling(s).

Although not shown in this example, the monitoring and communication module 312 may include one or more sensors and associated couplings the same as or similar to the sensors 118 and couplings 116 for sensing one or more conditions that relate to operation of the light source. In such a case, the communication module 312 would also include source operation-related sensor I/O circuitry similar to circuitry 239 in the example of FIG. 3. Although the module 312 does not control the source operation of the fixture 313, the information obtained by such additional sensing may be reported to the higher layer control computers as it may be useful in some system applications, e.g. to report on how well or poorly particular light fixtures are operating.

As noted in the discussion of FIG. 4, the intelligent lighting device 311 may support communication with and/or control of additional or ancillary devices provided in the vicinity of the light fixture 313. Although a wide range of such additional or ancillary devices may be provided for various applications of the device 311 in the context of a particular service provided by the system of FIG. 1, the specific example provided a video screen 327 and loudspeakers 329 for local information output. The monitoring and communication module 312 of the device 311 will include one or more drivers for communication with and/or control of any additional devices included in or associated with device 311. Hence, in this example, monitoring and communication module 312 includes one or more bus connected audio and/or video (A/V) drivers 335. Depending on the form/standard of the link to the video screen 327 and loudspeakers 329, the module may use a single combined driver or two separate drivers. The A/V driver(s) may be similar to drivers used in personal computers to drive an external monitor and speakers. Each driver 335 is of a type having a bus interface to enable the interface 335 to communicate internally with the µP 223 and/or other elements of the board 331 via the bus 224. For example, the module 312 may receive commands to provide audio and/or video output as well as the desired information content in packetized form via the network. The μP 223 controls the driver(s) 335 to cause the video screen 327 and loudspeakers 329 to provide outputs, and the driver(s) convert the received content to appropriate format signals so that the content is output in a presentable form as audio and video via the video screen 327 and loudspeakers 329.

The program memory for storing executable programming often is the memory on the control and communication board (either within the MCU or coupled to the μP via the bus in our three examples, FIGS. 2, 3 and 5). As outlined earlier, the exemplary sensors 118, 117 include at least some circuitry for processing the output of the transducers included as part of the sensors. In such a sensor, the circuitry receives the signal from the transducer(s) in the sensor and produces an output via the coupling that conforms to the signaling aspects of the sensor coupling standard, e.g. as a standard analog level signal on one or more pins designated for an analog connection and/or as appropriately formatted data on the pins designated for data outputs. The sensor circuitry may also receive standard control signals, e.g. digital command signals, over designated for data inputs to the sensor. Many implementations of such sensors will include a programmable processor, and some sensor configurations may include memory. If included as part of the sensor, the memory may contain the applications program (AP) for the relevant type of sensor. In such a case, the CPU may directly access the program in the sensor memory, or the application program AP may be uploaded from the sensor memory to the appropriate memory on the control and communication board.

The structure and operation of the intelligent lighting devices 101, 102 and 311, as outlined above, were described by way of example, only.

As shown by the above discussion, the higher layer functions relating to monitoring of one or more conditions external to the lighting devices not directly related to operational performance of the respective lighting devices, communications and related data processing and condition responsive functions may be implemented on various computers (at layers L2 to L4) connected for data communication via the components of a local or wide area network as shown in FIG. 1. Although special purpose devices may be used, such devices also may be implemented using one or more hardware platforms intended to represent any of the various available types of general purposes programmable devices, albeit with an appropriate network connection for data communication and appropriate programming to implement the functions discussed herein.

FIGS. 6, 7 and 8 provide functional block diagram illustrations of general purpose computer hardware platforms. FIG. 6 illustrates a network or host computer platform, as may typically be used to implement a host or server, such as one of the computer 13A, 13B, 23A, 23B or 27. FIG. 7 depicts a computer with user interface elements, as may be used to implement a personal computer or other type of work station or terminal device, such as one of the computers 15A or 29 in FIG. 1, although the computer of FIG. 7 may also act as a server if appropriately programmed. The computer of FIG. 8 represents an example of a mobile device, such as a tablet computer, smartphone or the like with a network interface to a wireless link. It is believed that those skilled in the art are familiar with the structure, programming and general operation of such computer equipment and as a result the drawings should be self-explanatory.

A server (see e.g. FIG. 6), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Also, a computer configured as a server with respect to one layer or function may be configured as a client of a server in a different layer and/or for a different function. For example, the intelligent lighting devices 11 may operate as client devices of server functions implemented by L2 computers such as 13A and 13B, whereas the same L2 computers 13A and 13B may function as clients with respect to at least some of the higher layer computers such as a computer 23A or 23B. Similarly, computers such as 23A, 23B that function as servers with respect to computers in the lower layer may be configured as client devices with respect to higher layer computer(s) such 27 configured as servers. If more effective for a particular system application, client-server arrangement outlined above could be inverted, so that the higher layer computers would be configured as clients with respect to server-configured computers in the next lower layer. Also, terminal devices often are configured as client devices.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 7). A mobile device (see FIG. 8) type user terminal may include similar elements, but will typically use smaller components that also require less power, to facilitate implementation in a portable form factor. The example of FIG. 8 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer of FIG. 7 is shown by way of example as using a RAM type main memory and a hard disk drive for mass storage of data and programming, whereas the mobile device of FIG. 8 includes a flash memory and may include other miniature memory devices.

The various types of user terminal devices will also include various user input and output elements. A computer, for example, may include a keyboard and a cursor control/selection device such as a mouse, trackball, joystick or touchpad; and a display for visual outputs (see FIG. 7). The mobile device example in FIG. 8 touchscreen type display, where the display is controlled by a display driver, and user touching of the screen is detected by a touch sense controller (Ctrlr).

The hardware elements, operating systems and programming languages of such user terminal devices also are conventional in nature, and it is presumed that those skilled in the art are adequately familiar therewith. Of note for purposes of this discussion, each type of computerized device will store and execute programming, including an operating system (OS) appropriate to the particular device and one or more application programs (APs). The programming will also implement an application programming interface (API) that allows the application programs to execute through OS on the processor(s) that function as the device CPU. At least some of the application programs (APs) are specifically written to configure the respective computerized devices to implement the functions of the L2 to L4 layer computers of the system 10, as described herein.

In several examples, the intelligence and sensors are integrated with or attached to the fixture or other element that incorporates the light source. However, for some installations, there may be some separation between the fixture or other element that incorporates the light source and the electronic components that provide the intelligence and communication capabilities. Also, in the examples, the sensors are incorporated in the fixture or module that houses the electronic components that provide the intelligence and communication capabilities. However, depending on the condition(s) to be sensed and/or the particular installation, the sensors and standardized couplings may be mounted somewhat separately and connected or otherwise coupled to the electronic components that provide the intelligence and communication capabilities.

The monitoring and communications elements may be applied to or combined with any type of light source. Hence, the intelligent lighting devices may be any desirable type of indoor or outdoor lighting device, signal lighting devices such as traffic lights, lighted signage, etc. A system like that of FIG. 1 may include within the one system any number of these different types lighting devices. A system operated by a city or municipality, for example, might add intelligence to street lights of various types, traffic lights and various types of indoor building lights in buildings used by the government. A system operated by a state or country might add intelligence to lights of the types mentioned with regard to the city, in each city or town of the state or country as well as to highway lights and sign lighting along roads, streets and highways between cities and towns in the jurisdiction. The broader the coverage, the more varied the types of lighting devices that are likely to be included in the system.

A system run by a private enterprise, either to monitor its own premises or to provide monitoring and the like as services to its customers might install intelligent lighting devices or add intelligent modules like that of FIG. 5, for indoor and outdoor lighting applications as various types of lighting devices on private property. If such an enterprise sells the services to a government, then the enterprise would install and operate a system like that described earlier for a city, state or country. One service provider enterprise might also sell the services both to government and to private parties, essentially resulting in an overall system that includes both government and private installations of the intelligent lighting devices and could combine data from all of the intelligent lighting devices.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An apparatus, comprising:
   a mounting structure;
   a light fixture connected to the mounting structure and oriented to emit illumination in a first direction;
   a video display device connected to the mounting structure and oriented to provide video content in a visible display output in a different second direction; and
   a monitoring and communications module coupled to the light fixture and the video display device, the module comprising:
      a sensor coupling configured to present a standardized sensor connection interface;
      a sensor connected to the standardized sensor connection interface of the sensor coupling, the standardized sensor connection interface being compatible with the sensor,
      wherein the sensor is configured to sense an ambient external condition related to an environment around or near the light fixture among a plurality of ambient external conditions not directly related to operation or control of the light fixture, the sensor being configured to output a signal responsive to the sensed ambient external condition via the standardized sensor connection interface of the sensor coupling;
      a processor;
      a communication interface accessible by the processor;
      a memory accessible to the processor; and
      a video driver configured to control the video display device to provide the video content associated with the sensed ambient external condition in the visible display output in response to the output signal to individuals located in the environment around or near the light fixture.

2. The apparatus of claim 1, further comprising a controller coupled to the light fixture and configured to control the light fixture to emit the illumination.

3. The apparatus of claim 2, further comprising a housing containing the controller and the light fixture and configured to provide the connection of the light fixture to the mounting structure.

4. The apparatus of claim 1, the module further comprising:
   a second communication interface; and
   a local wireless transceiver coupled to the second communication interface.

5. The apparatus of claim 1, further comprising:
a module housing containing at least the processor, memory and communication interface and configured to provide the connection of the module to the mounting structure,
wherein the module housing is configured for mounting together with the light fixture on the mounting structure.

6. The apparatus of claim 1, wherein the processor is coupled to control the light fixture to emit the illumination.

7. The apparatus of claim 1, wherein:
the module further comprises programming stored in the memory; and
execution of the programming by the processor configures the processor to implement functions, including functions to:
receive, from a network via the communication interface, information for visible display by the video display device; and
operate the video driver such that the video display device provides the information as the visible display output.

8. The apparatus of claim 1,
wherein the sensor is one of plurality of different types and the standardized sensor connection interface is compatible with the plurality of different types of sensors.

9. The apparatus of claim 8, wherein:
the module further comprises programming stored in the memory; and
execution of the programming by the processor configures the processor to implement functions, including functions to:
receive, in a standardized signal format, the signal from the sensor;
deliver, in a standardized data format and based at least in part on the signal, data representing the external condition sensed by the sensor to an application program corresponding at least in part to the one type of the sensor;
enable processing of the data representing the sensed external condition by the processor on behalf of the application program; and
communicate, in a standardized communications format enabled by the programming and via the communication interface, first information resulting from processing of the data representing the sensed external condition.

10. A system comprising a plurality of lighting devices and a communications network, each lighting device comprising:
a mounting structure;
a light fixture connected to the mounting structure and oriented to emit illumination in a first direction;
a video display device connected to the mounting structure and oriented to provide video content in a visible display output in a different second direction; and
a monitoring and communications module coupled to the light fixture and the video display device, the module comprising:
a sensor coupling configured to present a standardized sensor connection interface across the plurality of lighting devices;
a sensor connected to the standardized sensor connection interface of the sensor coupling, the standardized sensor connection interface being compatible with the sensor,
wherein the sensor is configured to sense one of a plurality of ambient external conditions related to an environment around or near the light fixture such that the one sensed ambient external condition is not directly related to operational performance of the respective lighting device, the sensor being configured to output a signal responsive to the one sensed ambient external condition via the standardized sensor connection interface of the sensor coupling;
a processor;
a communication interface accessible by the processor and configured to enable the processor to communicate through the communications network;
a memory accessible to the processor; and
a video driver configured to control the video display device to provide the video content associated with the one sensed ambient external condition in the visible display output in response to the output signal to individuals located in the environment around or near the light fixture.

11. The system of claim 10, wherein:
the module further comprises programming stored in the memory; and
execution of the programming by the processor configures the processor to implement functions, including functions to:
receive, from the communications network via the communication interface, information for visible display by the video display device; and
operate the video driver such that the video display device provides the information as the visible display output.

12. The system of claim 10, wherein:
the sensor is one of a plurality of different types of sensors and the standardized connection interface is compatible with the plurality of different types of sensors;
the sensor is configured to output a signal responsive to the one sensed condition via the standardized sensor connection interface of the sensor coupling; and
each respective lighting device further comprises a program corresponding at least in part to the one type of the sensor, stored in the memory for execution by the processor of the respective lighting device, for controlling at least one function of the respective processor responsive to the condition sensed by the sensor and communicating information resulting from the at least one function of the respective processor responsive to the condition sensed by the sensor through the communications network.

13. The system of claim 12, further comprising:
first layer computers having communications interfaces, wherein each first layer computer is configured:
to communicate through the communications network with a different respective group of the lighting devices so as to receive the information from the processors of the respective group of the lighting devices; and
to process the received information to obtain resultant information.

14. The system of claim 13, wherein each respective one of the first layer computers comprises:
a processor, coupled to the communications interface of the respective first layer computer, for processing the information from one of a respective group of the lighting devices;
a memory accessible to the processor of the respective first layer computer; and
an application program stored in the memory of the respective first layer computer for configuring the processor of the respective first layer computer to process the information from one of a respective group of the lighting devices to obtain the resultant information, wherein the application program is configured to operate through a standardized application programming interface supported by the operating systems of a plurality of the first layer computers.

15. The system of claim 13, further comprising:

a second layer computer having a communications interface to communicate through a communications network to receive the resultant information from the first layer computers, wherein the second layer computer is configured to initiate at least one action in response to processing of the resultant information received from the first layer computers.

16. The system of claim 15, wherein the second layer computer comprises:

a processor, coupled to the communications interface of the second layer computer, for processing the resultant information from the first layer computers;

a memory accessible to the processor of the second layer computer; and an application program stored in the memory of the second layer computer for configuring the processor of the second layer computer to process the resultant information received from the first layer computers and to initiate the at least one action in response to the processing of the resultant information received from the first layer computers, wherein the application program is configured to operate through an application programming interface of an operating system of the second layer computer.

17. The system of claim 15, wherein the at least one action in response to processing of the resultant information comprises sending a command back to one or more of the lighting devices to control the light source of each of the one or more of the lighting devices.

18. The system of claim 15, wherein the at least one action in response to processing of the resultant information comprises sending a command back to one or more of the lighting devices to control an operation or device other than the light source of each of the one or more of the lighting devices.

19. The system of claim 15, further comprising a third layer computer having a communications interface to communicate through a communications network, wherein:

the at least one action in response to processing of the resultant information comprises generating additional information based at least in part on the resultant information and sending the additional information to the third layer computer; and the third layer computer is configured to receive the additional information from the second layer computer and process the received additional information.

20. The system of claim 19, wherein the third layer computer is further configured to receive different additional information from a different second layer computer and process the received different additional information, the different additional information being generated by the different second layer computer based at least in part on different resultant information received by the different second layer computer from at least one different first layer computer configured to communicate through a different communications network with at least one other group of the lighting devices.

* * * * *